United States Patent
Denda

(10) Patent No.: US 9,802,619 B2
(45) Date of Patent: Oct. 31, 2017

(54) MOVING AMOUNT ESTIMATING APPARATUS, AUTONOMOUS MOBILE BODY, AND MOVING AMOUNT ESTIMATING METHOD

(71) Applicant: MURATA MACHINERY, LTD., Kyoto-shi, Kyoto (JP)

(72) Inventor: Yuki Denda, Kyoto (JP)

(73) Assignee: MURATA MACHINERY, LTD., Kyoto (JP)

( * ) Notice: Subject to any disclaimer, the term of this patent is extended or adjusted under 35 U.S.C. 154(b) by 53 days.

(21) Appl. No.: 14/933,263

(22) Filed: Nov. 5, 2015

(65) Prior Publication Data
US 2016/0152241 A1    Jun. 2, 2016

(30) Foreign Application Priority Data

Nov. 28, 2014    (JP) .................................. 2014-241158

(51) Int. Cl.
*B60W 40/10*    (2012.01)
*B60W 40/12*    (2012.01)
(Continued)

(52) U.S. Cl.
CPC .......... *B60W 40/10* (2013.01); *B60W 40/101* (2013.01); *B60W 40/12* (2013.01);
(Continued)

(58) Field of Classification Search
CPC .... B60W 40/10; B60W 40/101; B60W 40/12; B60W 2530/20; G01S 7/4808;
(Continued)

(56) References Cited

U.S. PATENT DOCUMENTS

| | | | | |
|---|---|---|---|---|
| 5,995,883 A | * | 11/1999 | Nishikado | ............ G05D 1/0242 701/25 |
| 2005/0278068 A1 | * | 12/2005 | Hong | ................... G05D 1/0253 700/259 |
| 2012/0219207 A1 | * | 8/2012 | Shin | ..................... G05D 1/0272 382/153 |

FOREIGN PATENT DOCUMENTS

| | | |
|---|---|---|
| CN | 103926925 A | 7/2014 |
| JP | 2004-318721 A | 11/2004 |

(Continued)

OTHER PUBLICATIONS

Martinez et al., "Mobile Robot Motion Estimation by 2D Scan Matching with Genetic and Iterative Closest Point Algorithms", Journal of Field Robotics, vol. 23, No. 1, Jan. 1, 2006, 24 pages.

(Continued)

*Primary Examiner* — Dale W Hilgendorf
(74) *Attorney, Agent, or Firm* — Keating & Bennett, LLP

(57) ABSTRACT

A moving amount estimating apparatus includes a position data obtaining unit, a first estimating unit, and a second estimating unit. The position data obtaining unit obtains a plurality of position data used to form a projection object image before and after movement of a mobile body. The first estimating unit calculates a moving amount of a parallel movement and/or a rotational movement of second position data as a moving amount of a mobile body when a plurality of moving position data is calculated. A second estimating unit compensates for a wheel moving amount based on a comparison between a second reference moving amount based on a rotating amount of a wheel during a predetermined period and a first reference moving amount obtained by calculating the moving amount of the mobile body in the first estimating unit during the predetermined period, and estimates the moving amount of the mobile body.

9 Claims, 9 Drawing Sheets

(51) Int. Cl.
　　　*B60W 40/101*　　(2012.01)
　　　*G01C 21/16*　　(2006.01)
　　　*G01S 7/48*　　(2006.01)
　　　*G01S 17/02*　　(2006.01)
　　　*G01S 17/89*　　(2006.01)
　　　*G05D 1/02*　　(2006.01)
　　　*G05D 1/00*　　(2006.01)
　　　*G01C 22/00*　　(2006.01)

(52) U.S. Cl.
　　　CPC .......... *G01C 21/165* (2013.01); *G01S 7/4808* (2013.01); *G01S 17/023* (2013.01); *G01S 17/89* (2013.01); *G05D 1/0088* (2013.01); *G05D 1/0272* (2013.01); *G05D 1/0274* (2013.01); *B60W 2530/00* (2013.01); *B60W 2530/20* (2013.01); *B60W 2600/00* (2013.01); *G01C 22/00* (2013.01); *G05D 1/024* (2013.01)

(58) Field of Classification Search
　　　CPC ..... G01S 17/023; G01S 17/89; G01C 21/165; G05D 1/0088; G05D 1/0272
　　　See application file for complete search history.

(56) References Cited

FOREIGN PATENT DOCUMENTS

| | | |
|---|---|---|
| JP | 2006-160116 A | 6/2006 |
| JP | 2012-089174 A | 5/2012 |

OTHER PUBLICATIONS

Lu et al., "Robot Pose Estimation in Unknown Environments by Matching 2D Range Scans" Proceedings of the Computer Society Conference on Computer Vision and Pattern Recognition, Jun. 21, 1994, pp. 935-938.

Surmann et al., "An Autonomous Mobile Robot with a 3D Laser Range Finder for 3D Exploration and Digitalization of Indoor Environments" Robotics and Autonomous Systems, vol. 45, No. 3-4, Dec. 31, 2003, pp. 181-198.

\* cited by examiner

FIG. 4
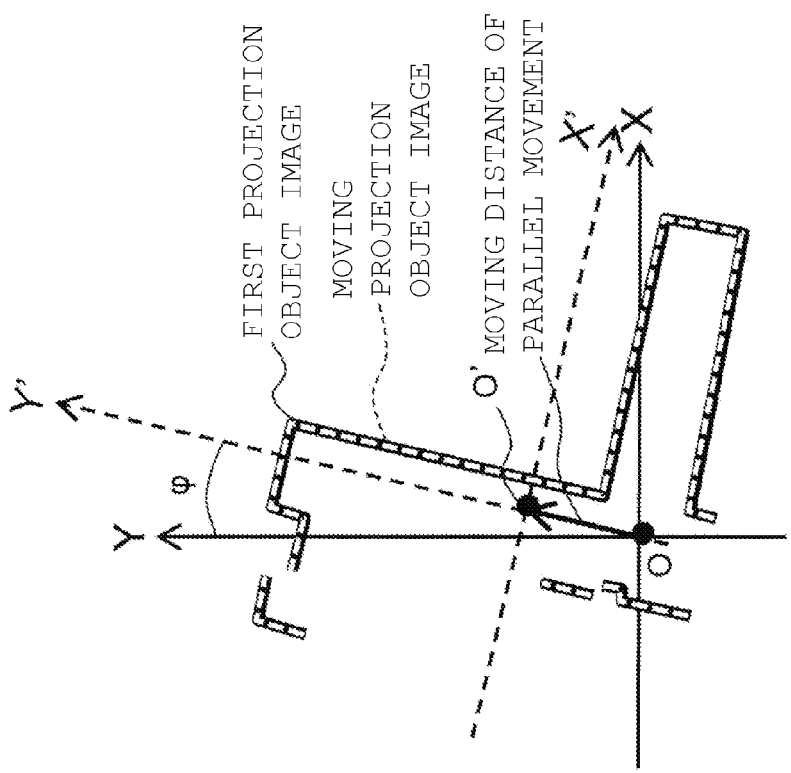
(1) PLOT FIRST POSITION DATA AND SECOND POSITION DATA
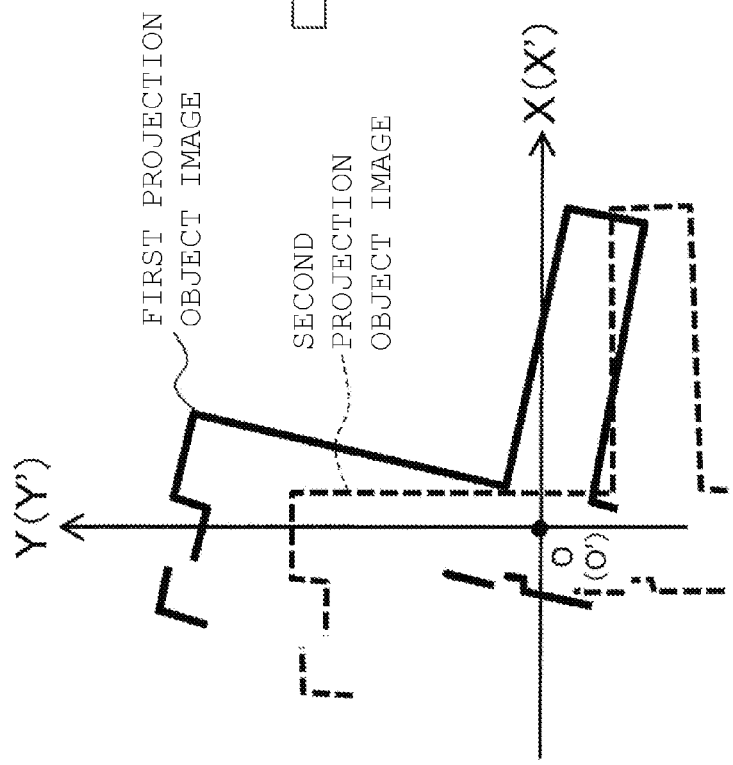
(2) FIRST PROJECTION OBJECT IMAGE MATCHES WITH MOVING PROJECTION OBJECT IMAGE

MOVING AMOUNT ESTIMATING APPARATUS, AUTONOMOUS MOBILE BODY, AND MOVING AMOUNT ESTIMATING METHOD

CROSS-REFERENCE TO RELATED APPLICATIONS

This application claims priority under 35 U.S.C. 119 to Japanese Patent Application No. 2014-241158, filed on Nov. 28, 2014, which application is hereby incorporated by reference in its entirety.

BACKGROUND OF THE INVENTION

1. Field of the Invention

The present invention relates to a moving amount estimating method for estimating a moving amount of a movable mobile body capable of being moved by rotation of a wheel, a moving amount estimating apparatus, and an autonomous mobile body including the moving amount estimating apparatus.

2. Description of the Related Art

Conventionally, a mobile body that can be moved in a predetermined space by rotation of a wheel is known. A travelling distance and/or a current position of such a mobile body are estimated based on a rotating amount of a wheel and/or a distance between the mobile body and an object present around the mobile body.

For example, JP 2004-318721 A discloses an autonomous travelling vehicle that includes an encoder and a distance measuring sensor and can travel according to rotational drive of a travelling wheel. In the autonomous travelling vehicle, a travelling distance of the autonomous travelling vehicle is calculated based on a rotation number measured by the encoder, and a distance between the autonomous travelling vehicle and a wall or an obstacle present around the vehicle is measured by the distance measuring sensor.

Further, the autonomous travelling vehicle described in JP 2004-318721 A compensates for a travelling distance per predetermined time calculated based on the rotation number of the travelling wheel using a change amount in the distance between the autonomous travelling vehicle and the wall or the obstacle measured by the distance measuring sensor per predetermined time. That is, in the conventional autonomous travelling vehicle, when the travelling distance calculated based on the rotation number of the travelling wheel includes an error caused by slippage between the travelling wheel and a floor, the error is compensated for according to the change amount of the distance per predetermined time measured by the distance measuring sensor.

However, the measurement error is not only included in the travelling distance calculated based on the rotation number (rotating amount) of the wheel measured by the encoder but also included in the distance between the autonomous travelling vehicle and an object such as an obstacle measured by the distance measuring sensor. For this reason, when a moving amount of the autonomous mobile body is small, the accuracy of the latter calculated travelling distance is below the accuracy of the former calculated travelling distance. In the autonomous travelling vehicle of JP 2004-318721 A, when an error is included in the distance measured by the distance measuring sensor and the moving amount of the autonomous mobile body is small, the travelling distance is transcribed into the travelling distance having lower accuracy.

SUMMARY OF THE INVENTION

According to a preferred embodiment of the present invention, in a mobile body capable of moving according to rotation of a wheel, compensation is accurately made so that a moving distance calculated based on a rotating amount of the wheel becomes a value close to an actual moving distance of the mobile body.

A plurality of aspects of various preferred embodiments of the present invention will be described below. These aspects can be arbitrarily combined as needed or desired.

According to one aspect of a preferred embodiment of the present invention, a moving amount estimating apparatus estimates a moving amount of a mobile body that is moved by rotation of a wheel and includes a position data obtaining unit, a first estimating unit, and a second estimating unit.

The position data obtaining unit obtains a plurality of position data used to form a projection object image. The projection object image is an image that is formed by plotting a plurality of position data on a predetermined coordinate and by projecting an object present around the mobile body onto the predetermined coordinate.

The first estimating unit calculates a moving amount when the mobile body moves. Specifically, the first estimating unit estimates a moving amount of parallel movement (translation) and/or a moving amount of a rotational movement (posture shift) of a plurality of second position data when a first projection object image matches with a moving projection object image as the moving amount when the mobile body moves.

The first projection object image is a projection object image to be formed by a plurality of first position data. The plurality of first position data includes a plurality of position data that is obtained one of before and after the movement of the mobile body.

The moving projection object image is a projection object image to be formed by a plurality of moving position data. The plurality of moving position data is a plurality of position data that is obtained by moving the plurality of second position data parallelly and/or rotationally on a predetermined coordinate. The plurality of second position data include a plurality of position data obtained the other of before and after the movement of the mobile body.

Note that, "the other of before and after the movement of the mobile body" means "after the movement of the mobile body" when the first position data is obtained before the movement of the mobile body, whereas "the other of before and after the movement of the mobile body" means "before the movement of the mobile body" when the first position data is obtained after the movement of the mobile body.

That is, the first estimating unit calculates a moving amount at times of the parallel movement and/or the rotational movement of the second position data as the moving amount when the mobile body moves, in order to obtain the plurality of moving position data used to form the moving projection object image to match with the first projection object image.

The second estimating unit compensates for a wheel moving amount of the wheel based on a comparison between a second reference moving amount and a first reference moving amount. Further, the second estimating unit estimates the compensated wheel moving amount as the moving amount of the mobile body. The wheel moving amount is a moving amount to be calculated based on the rotating amount of the wheel. The second reference moving amount is a wheel moving amount to be calculated based on the rotating amount of the wheel during a predetermined period of the movement of the mobile body. The first reference moving amount is a calculated value of the moving amount in the first estimating unit when the mobile body moves during the predetermined period.

In the moving amount estimating apparatus, when the mobile body moves during the predetermined period, the position data obtaining unit obtains a plurality of first position data one of before and after the movement of the mobile body, and obtains a plurality of second position data the other of before and after the movement of the mobile body.

After the plurality of first position data and the plurality of second position data are obtained, the first estimating unit calculates the first reference moving amount. Specifically, the first estimating unit moves the plurality of second position data parallelly and/or rotationally on a predetermined coordinate so as to calculate the moving position data. Thereafter, the first estimating unit determines whether the moving projection object image to be formed by the moving position data matches with the first projection object image to be formed by the first position data. When the determination is made that the moving projection object image matches with the first projection object image, the first estimating unit determines the moving amount of the parallel movement and/or the moving amount of the rotational movement when the second position data is moved parallelly and/or rotationally in order to obtain the moving position data forming the moving projection object image to match with the first projection object image as the first reference moving amount.

Further, the second reference moving amount is calculated based on the rotating amount of the wheel measured during the predetermined period.

After the first reference moving amount and the second reference moving amount are calculated, the second estimating unit compensates for the rotating amount of the wheel when the mobile body moves or the wheel moving amount of the mobile body, which is calculated based on the rotating amount of the wheel, based on a comparison between the second reference moving amount and the first reference moving amount. The second estimating unit estimates the compensated wheel moving amount as the moving amount of the mobile body.

In the moving amount estimating apparatus, the first reference moving amount to be used to compensate for the wheel moving amount is determined as the parallel moving amount and/or the moving amount of the rotational movement of the second position data when the moving position data is obtained such that the first projection object image matches with the moving projection object image. In other words, the moving amount when the projection object image to be formed by the plurality of second position data is moved so as to match with the first projection object image is determined as the first reference moving amount. Therefore, an influence of a measurement error included in the plurality of position data is significantly reduced or prevented, so that the first reference moving amount can be calculated as a value closer to the actual moving amount of the mobile body.

As a result, the second estimating unit compensates for the wheel moving amount more accurately using the first reference moving amount calculated with the influence of the measurement error included in the plurality of position data being reduced.

Further, the plurality of first position data and the plurality of second position data are obtained before and after the movement of the mobile body, respectively, namely, at a comparatively short time interval. This significantly reduces or eliminates problems such that an image present on the first projection object image to be formed by the plurality of first position data is not present on the projection object image (may also be referred to as a second projection object image) to be formed by the plurality of second position data, and on the contrary, an image that is not present on the first projection object image is likely to be present on the second projection object image (referred to as a change in ambient environment). As a result, the first estimating unit is able to prevent the first reference moving amount from being estimated by mistake due to the change in ambient environment and is able to calculate the first reference moving amount accurately. As a result, the wheel moving amount is compensated for more accurately.

The moving amount estimating apparatus may further include a compensation coefficient calculator. The compensation coefficient calculator calculates a compensation coefficient as a result of comparing the second reference moving amount with the first reference moving amount. The compensation coefficient is a coefficient to be calculated based on the first reference moving amount and the second reference moving amount. In this case, the second estimating unit compensates for the wheel moving amount using the compensation coefficient.

As a result, calculating frequencies of the second reference moving amount and the first reference moving amount is able to be significantly reduced. Further, even while the mobile body is moving at a location where the estimation of the position and the moving amount using the position data about a region where an object such as a wall is not present around the mobile body are difficult, the wheel moving amount is able to be compensated for more accurately. As a result, the moving amount of the mobile body is accurately estimated even in the above-described location based on the compensated wheel moving amount.

The moving amount estimating apparatus may further include an evaluating unit. The evaluating unit evaluates whether the compensation coefficient is appropriately calculated based on a result of comparing a past compensation coefficient and the compensation coefficient. The past compensation coefficient is a compensation coefficient calculated during a past period. The past period is a period before a predetermined period in which the compensation coefficient is calculated.

As a result, a determination is able to be made whether the compensation coefficient calculated at this time is calculated more reasonably based on characteristics of the wheel in comparison with the past compensation coefficient calculated at a previous time.

When the determination is made that the compensation coefficient is not appropriately calculated, the second estimating unit may use the past compensation coefficient as the compensation coefficient. As a result, when the compensation coefficient calculated at this time is calculated as an erroneous value, the second estimating unit avoids compensation of the wheel moving amount using the compensation coefficient calculated erroneously. That is, the wheel moving amount is prevented from being compensated for inaccurately.

The compensation coefficient calculator may calculate the compensation coefficient based on the compensation coefficient that is calculated based on the comparison between the first reference moving amount and the second reference moving amount and an updated coefficient having a predetermined value. As a result, a degree of variation caused by the compensation is controlled.

The second estimating unit may calculate the wheel moving amount based on a reference wheel diameter that is a predetermined diameter of the wheel and the rotating amount of the wheel. In this case, the second estimating unit compensates for the wheel moving amount using the compensation coefficient. That is, the second estimating unit compensates for the wheel moving amount, which is calculated by using the reference wheel diameter, using the compensation coefficient. As a result, the wheel moving amount is able to be compensated for by simpler calculation.

The second estimating unit may calculate a compensation wheel diameter. The compensation wheel diameter is calculated based on the reference wheel diameter and the compensation coefficient. In this case, the second estimating unit calculates the moving amount of the mobile body based on the compensation wheel diameter and the rotating amount of the wheel. That is, the second estimating unit compensates the reference wheel diameter using the compensation coefficient so as to calculate the compensation wheel diameter, and determines a value calculated based on the compensation wheel diameter and the rotating amount of the wheel as the moving amount of the mobile body. As a result, the moving amount of the mobile body to be calculated based on the rotating amount of the wheel is compensated for and simultaneously the wheel diameter is also compensated for.

The moving amount estimating apparatus may further include a diameter change calculator. The diameter change calculator calculates a change in a diameter of the wheel based on a comparison between the compensation wheel diameter and the reference wheel diameter. As a result, the change in the diameter of the wheel is able to be monitored.

The moving amount estimating apparatus may further include a compensation data obtaining command unit. The compensation data obtaining command unit specifies a predetermined period in which the first reference moving amount and the second reference moving amount are calculated. As a result, data used to calculate the first reference moving amount and the second reference moving amount is able to be obtained at timing at which both the plurality of position data and the rotating amount of the wheel is able to be obtained.

According to another aspect of various preferred embodiments of the present invention, an autonomous mobile body includes the moving amount estimating apparatus, a travelling unit, a position estimating unit, and a travelling controller. The travelling unit includes a wheel, and travels according to rotation of the wheel. That is, the travelling unit moves the autonomous mobile body according to the rotation of the wheel. The position estimating unit estimates a current position of autonomous mobile body based on a moving amount to be estimated by the moving amount estimating apparatus. The travelling controller controls the travelling unit so that the autonomous mobile body travels from the current position to a predetermined target position.

In the autonomous mobile body, the moving amount of the autonomous mobile body is estimated more accurately by the moving amount estimating apparatus. As a result, the position estimating unit of the autonomous mobile body is able to estimate a more accurate position of the autonomous mobile body. As a result, the travelling controller controls the travelling unit so that the autonomous mobile body is appropriately moved from the current position to the predetermined target position. That is, the autonomous mobile body is provided with the moving amount estimating apparatus so that the autonomous mobile body autonomously travels on an intended moving route accurately.

A moving amount estimating method according to still another aspect of various preferred embodiments of the present invention is a method for estimating the moving amount of the mobile body to be moved by the rotation of the wheel that includes a step of obtaining a plurality of position data forming a projection object image obtained by projecting an object present around a mobile body onto a predetermined coordinate before and after the mobile body moves during a predetermined period, a step of moving the plurality of second position data obtained any one of before and after the movement parallelly and/or rotationally on the predetermined coordinate so as to calculate the plurality of position data, a step of calculating a first reference moving amount based on a moving amount of a parallel movement and/or a moving amount of a rotational movement of the plurality of second position data when the plurality of moving position data is obtained such that a first projection object image to be formed by a plurality of first position data obtained the other of before and after the movement matches with a moving projection object image to be formed by the plurality of moving position data, a step of calculating a second reference moving amount based on a rotating amount of the wheel during the predetermined period, a step of compensating for a wheel moving amount, which is to be calculated based on the rotating amount of the wheel, based on a comparison between the second reference moving amount and the first reference moving amount, and a step of estimating the compensated wheel moving amount as the moving amount of the mobile body.

In the moving amount estimating method, the first reference moving amount to be used to compensate for the wheel moving amount is determined as the parallel moving amount and/or the wheel moving amount of the second position data when the moving position data is obtained such that the first projection object image matches with the moving projection object image. In other words, the moving amount, in which the projection object image to be formed by the plurality of second position data is moved so as to match with the first projection object image, is determined as the first reference moving amount. Therefore, an influence of a measurement error included in the plurality of position data is reduced, so that the first reference moving amount is able to be calculated as a value closer to the actual moving amount of the mobile body.

As a result, in the moving amount estimating method, the first reference moving amount, which is calculated by reducing the influence of the measurement error included in the plurality of position data, is used so that the wheel moving amount is compensated for more accurately.

A moving distance (the wheel moving amount) calculated based on the rotating amount of the wheel is compensated for accurately so as to be a value close to an actual moving distance of the mobile body.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 4 is a diagram schematically illustrating an ICP method.

DETAILED DESCRIPTION OF THE PREFERRED EMBODIMENTS

First Preferred Embodiment

Figure 1:
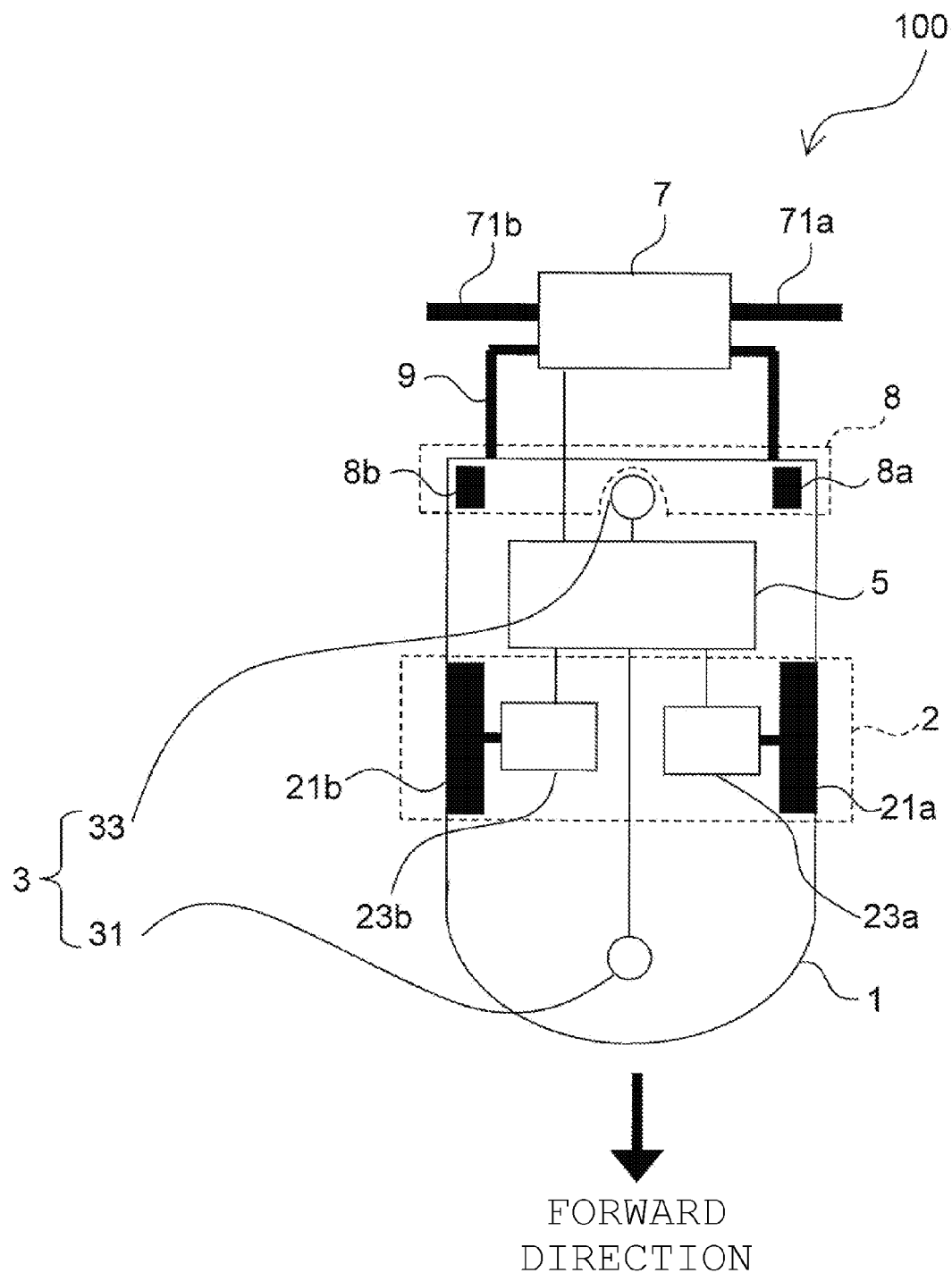
FIG. 1 is a diagram illustrating an entire configuration of an autonomous mobile body.

An autonomous mobile body according to a first preferred embodiment of the present invention is described below. The entire configuration of an autonomous mobile body 100 according to the first preferred embodiment is described with reference to FIG. 1. The autonomous mobile body 100 according to this preferred embodiment is a mobile body that autonomously travels along a desired scheduled travelling route that is predetermined.

The autonomous mobile body 100 mainly includes a main body 1, a travelling unit 2, a position data obtaining unit 3 (e.g., a position data detector), and a controller 5. The main body 1 constitutes a main body of the autonomous mobile body 100.

The travelling unit 2 includes, as illustrated in FIG. 1, wheels 21a and 21b and is installed near a center of a bottom of the main body 1 via motors 23a and 23b (described later) so that the wheels 21a and 21b make contact with a travelling surface such as a floor surface of a moving region. Further, the wheels 21a and 21b are mounted to output rotary shafts of the motors 23a and 23b provided to right and left sides of the main body 1, respectively, so as to be rotatable around the output rotary shafts.

The motors 23a and 23b receive driving signals (described later) from the controller 5 and rotates the respective output rotary shafts based on the driving signals from the controller 5. The wheels 21a and 21b rotate in rotating amounts and/or at rotating speeds according to the driving signals from the controller 5. The travelling unit 2 moves the main body 1 (namely, the autonomous mobile body 100) according to rotation of the wheels 21a and 21b that rotate at the rotating amounts and/or at the rotating speeds corresponding to the driving signals. Electric motors such as brushless motors can be used as the motors 23a and 23b, for example.

Further, devices, not illustrated in FIG. 1, that measure rotating numbers (rotating amounts) of the output rotary shafts of the motors 23a and 23b are mounted to the output rotary shafts of the motors 23a and 23b, respectively. The rotating amounts of the output rotary shafts measured by the devices are then output to the controller 5.

The controller 5 is configured or programmed to calculate the rotating amounts of the wheels 21a and 21b based on the rotating amounts of the output rotary shafts of the motors 23a and 23b. Encoders or the like can be used as the devices that measure the rotating amounts of the output rotary shafts of the motors 23a and 23b. When the rotating amounts of the output rotary shafts are measured by, for example, incremental type encoders, the rotating amounts of the output rotary shafts are able to be measured as pulse numbers per predetermined time included in pulse signals to be output from the encoders.

The position data obtaining unit 3 obtains a plurality of position data. The plurality of position data forms an image obtained by projecting an object such as an obstacle or a wall present around the autonomous mobile body 100 onto a predetermined coordinate (hereinafter, referred to as an "object projection image"). That is, the plurality of position data is defined as a coordinate value on the predetermined coordinate.

The plurality of position data that can form the object projection image can be obtained by using a laser range finder (LRF) or the like as the position data obtaining unit 3. A device such as a ToF (Time of Flight) camera that measures a distance from the device to a certain object present around the device can also be used as the position data obtaining unit 3, for example.

In this preferred embodiment, the laser range finder is preferably used as the position data obtaining unit 3, but in this case, the plurality of position data is obtained as, for example, two-dimensional data including a distance from the autonomous mobile body 100 to a predetermined portion of the object (for example, a portion of a surface of the object reflecting a signal output from the laser range finder) and an angle representing a direction from the autonomous mobile body 100 where the portion of the object is present.

Further, when the ToF camera is used as the position data obtaining unit 3, the plurality of position data is obtained as, for example, three-dimensional data including a distance from the autonomous mobile body 100 to a predetermined portion of the object (for example, a portion of a surface of the object reflecting a signal output from the ToF camera), an angle in a horizontal direction on a two-dimensional plane and an angle in a vertical direction representing directions from the autonomous mobile body 100 where the portion of the object is present.

When the moving amount of the autonomous mobile body 100 is estimated based on the plurality of position data as described later, the moving amount may be estimated by using position data having the obtained distance and angle as coordinate values. In this case, the position data is defined as the coordinate values of the distance from the autonomous mobile body 100 to the object and the angle with respect to the autonomous mobile body 100 at which the object is present.

Alternatively, the moving amount of the autonomous mobile body 100 may be estimated by using new position data obtained by performing suitable coordinate conversion on the obtained position data. For example, the obtained position data is able to be converted by the coordinate conversion into position data having coordinate values of coordinates representing a relative position with respect to the autonomous mobile body 100 (for example, an X-Y coordinate in two dimensions, and an X-Y-Z coordinate in three dimensions) (one example of the predetermined coordinate).

In this preferred embodiment, the obtained position data is defined as the coordinate value of the X-Y coordinate, so that the moving amount of the autonomous mobile body 100 is estimated. As a result, the actual moving amount of the autonomous mobile body 100 in the moving region is able to be directly estimated.

The position data to be obtained in the position data obtaining unit 3 is coordinate value data that is not influenced by a change in diameters caused by use of the wheels 21a and 21b. In this preferred embodiment, therefore, the plurality of position data obtained in the position data obtaining unit 3 are used to calculate a moving amount that is closer to the actual moving amount of the autonomous mobile body 100 within the moving region.

As illustrated in FIG. 1, the position data obtaining unit 3 preferably includes a forward data obtaining unit 31 and a backward data obtaining unit 33. The forward data obtaining unit 31 is mounted to a front portion of the autonomous mobile body 100, and is able to obtain position data of an object present in front of the autonomous mobile body 100. On the other hand, the backward data obtaining unit 33 is mounted to a back portion of the autonomous mobile body 100 in an advancing direction, and is able to obtain position data from an object present at the back of the autonomous mobile body 100.

In this preferred embodiment, a position data obtainable range of the forward data obtaining unit 31 is wider than a position data obtainable range of the backward data obtaining unit 33. In this preferred embodiment, for example, preferably the backward data obtaining unit 33 is able to detect an object present within an about 180° range of the back of the autonomous mobile body 100 within an approximate 10 m radius from a center of the backward data obtaining unit 33, whereas the forward data obtaining unit 31 is able to detect an object present within an about 270° range of the front of the autonomous mobile body 100 within an approximate 30 m radius from a center of the forward data obtaining unit 31.

In such a manner, the position data obtaining unit 3 is able to detect an object present within a wider range from the center of the autonomous mobile body 100 (particularly, in front of the autonomous mobile body 100). An object detecting range of the forward data obtaining unit 31 and an object detecting range of the backward data obtaining unit 33 are not limited to the above-described detecting ranges, and suitable ranges can be set as needed.

In this preferred embodiment, the forward data obtaining unit 31 and/or the backward data obtaining unit 33 preferably are mounted above (the front and the back of) the main body 1. As a result, when an object placed on a floor surface in the moving region frequently moves (for example, when layouts of shelves and signboards are frequently changed as in large retailers), a temporal change in a projection object image to be formed by the plurality of position data obtained by the forward data obtaining unit 31 and the backward data obtaining unit 33 (particularly, a change such that an object present at a certain time is not present at another time) can be reduced.

In the conventional technique, when an object placed in the moving region is frequently moved, a projection object image to be formed by the plurality of position data obtained before the autonomous mobile body 100 moves is greatly different from a projection object image to be formed by the plurality of position data obtained after the movement in some cases. When the projection object images are different before and after the movement, it is difficult to match one of the projection object images before and after the movement with the other of the projection object images, even if one of the projection object images before and after the movement is moved in any way. In this case, it is difficult to estimate the moving amount of the autonomous mobile body 100 using the plurality of position data.

In the conventional technique, when the projection object images before and after the movement of the autonomous mobile body 100 are greatly different from each other and the determination is made that the moved projection object image matches with the projection object image as a reference, the moving amount, to be estimated from the moving amount of the moved projection object image, of the autonomous mobile body 100 is very different from the actual moving amount of the autonomous mobile body 100 in some cases. That is, a great error is occasionally caused between the moving amount, which is estimated based on the plurality of position data, of the autonomous mobile body 100 and the actual moving amount of the autonomous mobile body 100.

In order to solve these problems, in this preferred embodiment, the forward data obtaining unit 31 and/or the backward data obtaining unit 33 are provided above the main body 1 (for example, a position exceeding heights of a person's head or store shelves), so that a probability of detecting an object to be frequently moved is reduced. As a result, the moving amount of the autonomous mobile body 100 is able to be estimated accurately by using the plurality of position data obtained by the forward data obtaining unit 31 and the backward data obtaining unit 33 (the position data obtaining unit 3) without causing a great error.

The controller 5 controls the travelling unit 2. Further, the controller 5 estimates the position of the autonomous mobile body 100 within the moving region in order to control the travelling unit 2.

When the autonomous mobile body 100 has the above configuration, the autonomous mobile body 100 can autonomously move along the predetermined travelling route while estimating a position of the mobile body 100 within the moving region.

As illustrated in FIG. 1, the autonomous mobile body 100 according to the first preferred embodiment further includes an operation unit 7 mounted to the main body 1 via a mounting member 9. As illustrated in FIG. 1, the operation unit 7 includes turnable operation handles 71a and 71b, and operating amounts (turning amounts) of the operation handles 71a and 71b is able to be output to the controller 5. As a result, the controller 5 calculates driving signals that control the motors 23a and 23b in accordance with the operating amounts of the operation handles 71a and 71b.

Provision of the operation unit 7 to the autonomous mobile body 100 enables an operator to operate the autonomous mobile body 100. Specifically, the operator turns the operation handles 71a and 71b and adjusts the turning amounts and the rotating speeds of the wheels 21a and 21b, so as to be capable of operating the autonomous mobile body 100.

Further, the controller 5 is able to estimate a position of the main body of the autonomous mobile body 100 in the moving region. For this reason, when the operator operates the autonomous mobile body 100 using the operation unit 7, the position of the autonomous mobile body 100 is estimated at predetermined time intervals, and the estimated position is stored in a storage unit 51 or the like. As a result, the operation of the autonomous mobile body 100 performed by the operator is presented as the predetermined travelling route to the autonomous mobile body 100 (the controller 5).

A method for presenting the travelling route to the autonomous mobile body 100 is not limited to a method for estimating and storing the position of the autonomous mobile body 100 while the operator is operating the autonomous mobile body 100 using the operation unit 7. For example, the travelling route can be presented to the autonomous mobile body 100 also by directly operating (or directly inputting) values of (a plurality of) coordinate points on data where the coordinate points on a moving coordinate representing the moving region are stored. Alternatively, the travelling route can be presented to the autonomous mobile body 100 by another method for specifying a position of the autonomous mobile body 100 in the moving range (a coordinate value of the moving coordinate).

Further, the autonomous mobile body 100 of the first preferred embodiment preferably further includes a safety wheel unit 8. The safety wheel unit 8 includes two safety wheels 8a and 8b. The two safety wheels 8a and 8b are mounted to a rear bottom surface of the main body 1 so as to be each independently rotatable. The provision of the safety wheel unit 8 enables the autonomous mobile body 100 to move stably and smoothly.

Figure 2:
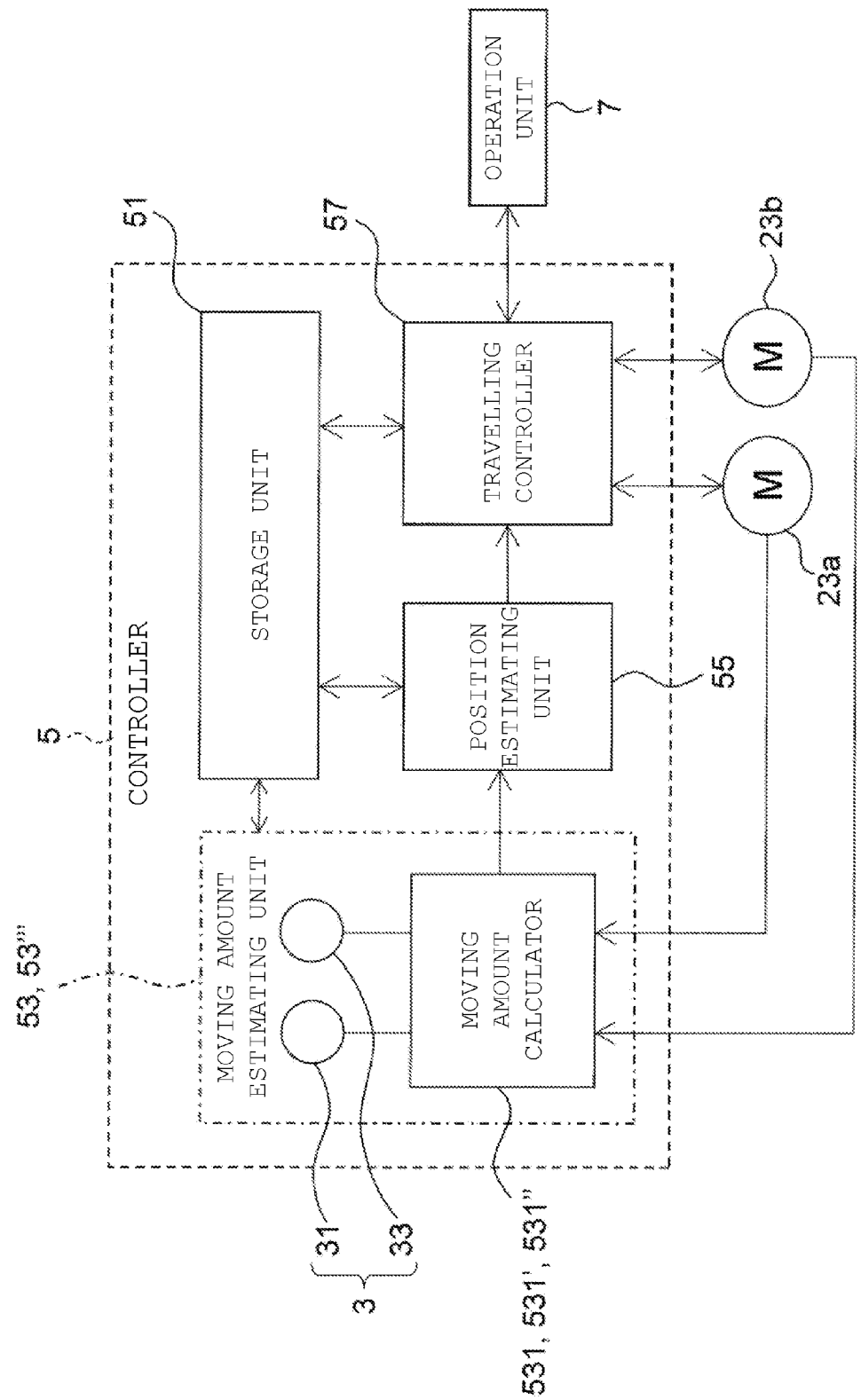
FIG. 2 is a diagram illustrating a configuration of a controller.

The entire configuration of the controller 5 is described below with reference to FIG. 2. The controller 5 can be realized by a microcomputer system or the like that includes a CPU (Central Processing Unit), a hard disc device, a ROM (Read Only Memory), a RAM (Random Access Memory), a storage device constituted by a storage medium reading device, and an interface that converts a signal. Further, some of or all of functions of the respective units of the controller 5 to be described below may be realized as at least one program that is executable by the CPU of the controller 5, for example. The at least one program may be stored in a storage device of a microcomputer. Alternatively, some of or all of the functions of the respective units of the controller 5 may be realized by a custom IC, circuitry, or the like, for example.

Further, the controller 5 may be configured by a plurality of microcomputer systems. For example, a moving amount estimating unit 53 (one example of a moving amount estimating apparatus), described later, a travelling controller 57, and other components of the controller 5 may be configured by the individual microcomputer systems.

The controller 5 preferably includes the storage unit 51, the moving amount estimating unit 53, a position estimating unit 55 (e.g., a position estimator), and the travelling controller 57. The storage unit 51 corresponds to at least a portion of a storage region of the storage device constituting the controller 5. The storage unit 51 stores information relating to the moving route necessary for autonomous movement of the autonomous mobile body 100 in the moving region. Examples of the information relating to the moving route are data representing coordinate values on the moving coordinate corresponding to positions in the moving region where the autonomous mobile body 100 should pass during the autonomous movement, and map information representing the moving region (may also be referred to as a global map or an environmental map). In addition, the storage unit 51 stores various setting values necessary for the operation of the autonomous mobile body 100.

The moving amount estimating unit 53 estimates a moving distance of the autonomous mobile body 100. For this reason, the moving amount estimating unit 53 includes a moving amount calculator 531. The moving amount calculator 531 calculates a distance (moving amount) along which the autonomous mobile body 100 moves based on the plurality of position data obtained by the position data obtaining unit 3 and the rotating amounts of the wheels 21a and 21b measured by the encoders or the like of the motors 23a and 23b of the travelling unit 2.

The position estimating unit 55 estimates a present position of the autonomous mobile body 100 in the moving region. In this preferred embodiment, the position estimating unit 55 estimates a current position of the autonomous mobile body 100 using SLAM (Simultaneous Localization and Mapping) method based on a map matching result of map information representing a position of an object such as a wall or an obstacle around the autonomous mobile body 100 present at the current position (local map), and map information representing the moving region (the entire moving region or a portion of the moving region including at least a region where the autonomous mobile body 100 moves) stored in advance (the global map, the environmental map).

Specifically, the position estimating unit 55 generates a plurality of "temporary current positions" calculated by adding a predetermined error to the moving amount estimated by the moving amount estimating unit 53. The temporary current positions are able to be calculated by, for example, adding the moving amount to which the error is added to the position of the autonomous mobile body 100 estimated before the movement.

The local map is generated by using the plurality of position data obtained on the temporary current position through the position data obtaining unit 3 for each of the temporary current positions. Thereafter, the position estimating unit 55 estimates a temporary current position where the local map, which matches the most with the environmental map, in the plurality of generated local maps is generated as the current position of the autonomous mobile body 100.

When the plurality of position data cannot be obtained because the autonomous mobile body 100 moves on a region where a wall or the like is not present, or when a temporary change hardly occurs in the map information because the autonomous mobile body 100 moves on a linear passage without branching, the position estimating unit 55 adds a moving amount input from the moving amount estimating unit 53 to a position estimated before the movement so as to be capable of estimating the current position of the autonomous mobile body 100.

Further, when the operator operates the autonomous mobile body 100 using the operation unit 7, the position estimating unit 55 may estimate the position of the autonomous mobile body 100 at predetermined time intervals (for example, per control cycle) using the above method and store information about the estimated position (coordinate values or the like) in the storage unit 51. Accordingly, the position estimating unit 55 can store the moving operation of the autonomous mobile body 100 to be performed by the operator in the storage unit 51.

The position estimating unit 55 may update the environmental map to be stored in the storage unit 51 using the local map generated in the current position. As a result, even when the position of an obstacle or the like is changed in the moving region, a new environmental map after the position of the obstacle is changed can be created to be stored.

When the autonomous mobile body 100 autonomously moves, the travelling controller 57 controls the travelling unit 2 so that the autonomous mobile body 100 travels from the current position to a predetermined target position included in the predetermined moving route stored in the storage unit 51 (for example, the route on which the autonomous mobile body 100 is moved by the moving operation performed by the operator).

The travelling controller 57 outputs the driving signals individually to the motors 23a and 23b. That is, the motors 23a and 23b can rotate at different rotating speeds. For example, when the autonomous mobile body 100 is desired to be moved straight, the motors 23a and 23b are rotated at the same rotating speeds. On the other hand, when the motors 23a and 23b are rotated at different rotating speeds, the autonomous mobile body 100 can make rotary motions (a right turn and a left turn).

A travelling unit, in which the two wheels 21a and 21b are rotated to travel individually by the motors 23a and 23b like the travelling unit 2 illustrated in FIG. 1, is referred to also as a "differential two-wheel" travelling unit.

Further, the travelling controller 57 is able to input turning amounts (operating amounts) of the operation handles 71a and 71b from the operation unit 7, and calculate the driving signals based on the input turning amounts so as to output the respective driving signals to the motors 23a and 23b. As a result, the autonomous mobile body 100 is able to be operated by the operator who operates the operation handles 71a and 71b.

A control device or the like using a feedback control theory can be used as the travelling controller 57. When the control device adopting the feedback control theory is used as the travelling controller 57, the travelling controller 57 is able to input pulse signals from the encoders mounted to the output rotary shafts of the motors 23a and 23b and is able to control the rotating numbers of the motors 23a and 23b in accordance with a control command.

Figure 3:
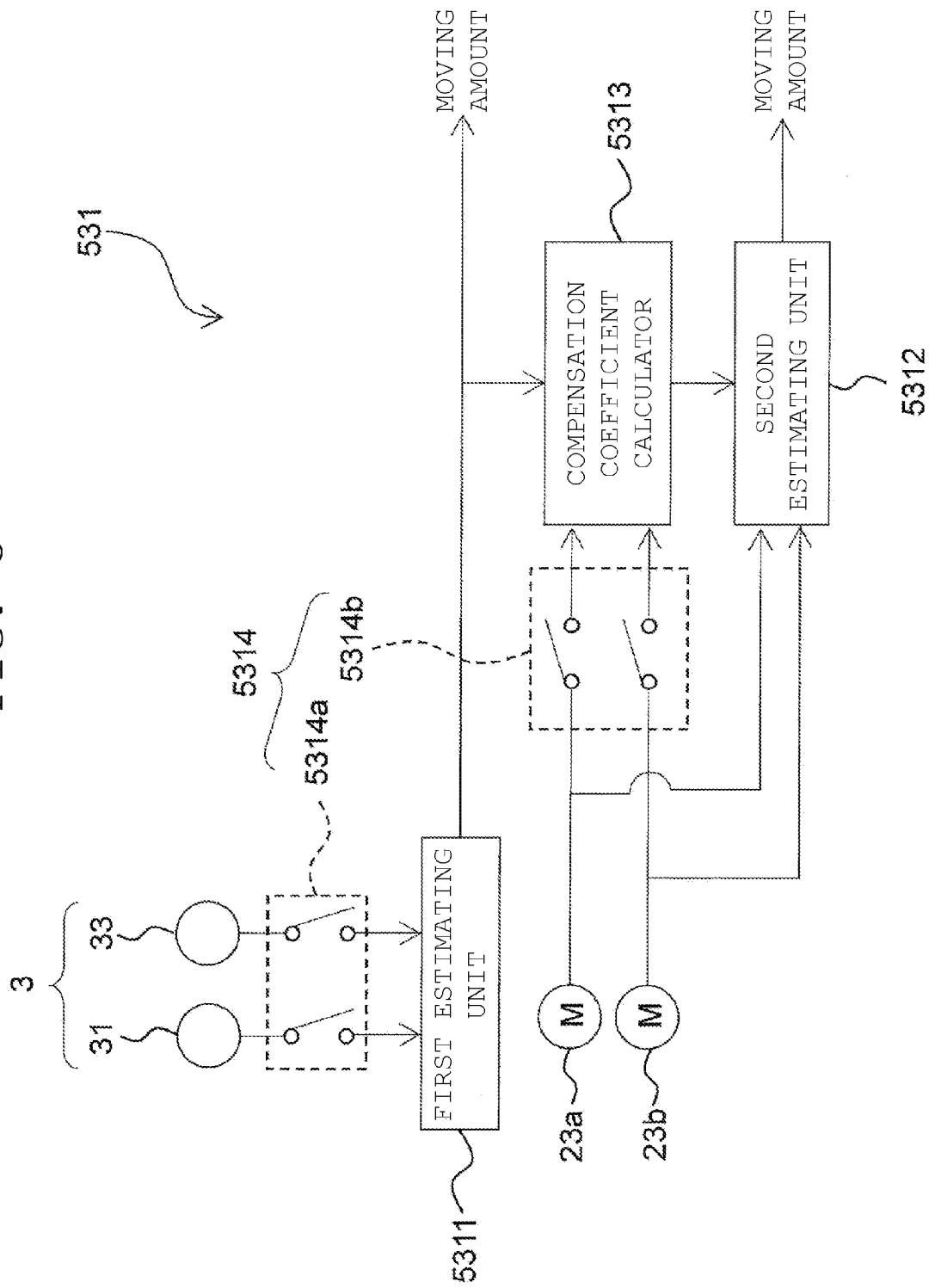
FIG. 3 is a diagram illustrating a configuration of a moving amount calculator according to a first preferred embodiment of the present invention.

The configuration of the moving amount calculator 531 according to the first preferred embodiment is described below with reference to FIG. 3. The moving amount calculator 531 of the first preferred embodiment preferably includes a first estimating unit 5311 (e.g., a first estimator) and a second estimating unit 5312 (e.g., a second estimator).

The first estimating unit 5311 calculates a moving amount when the autonomous mobile body 100 moves using the plurality of position data obtained by the position data obtaining unit 3. Specifically, the first estimating unit 5311 calculates the moving amount of the autonomous mobile body 100 based on the plurality of position data obtained before the movement of the autonomous mobile body 100 and the plurality of position data obtained after the movement.

The second estimating unit 5312 estimates the moving amount of the autonomous mobile body 100 based on a wheel moving amount to be calculated based on the rotating amounts of the wheels 21a and 21b during the movement of the autonomous mobile body 100. The wheel moving amount is able to be calculated based on reference wheel circumferential lengths (obtained by multiplying reference wheel diameters of the wheels 21a and 21b (reference wheel diameters) by $\pi$) and the measured rotating amounts of the wheels 21a and 21b.

Further, the second estimating unit 5312 compensates for the wheel moving amount based on a comparison between a second reference moving amount and a first reference moving amount. The second reference moving amount is a moving amount to be calculated based on the rotating amounts of the wheels 21a and 21b during a predetermined period in which the autonomous mobile body 100 moves. Further, the first reference moving amount is an estimated value of the moving amount of the autonomous mobile body 100 during the predetermined period. The estimated value is estimated in the first estimating unit 5311 by using the plurality of position data obtained before and after the predetermined period.

The second estimating unit 5312 estimates the compensated wheel moving amount as the actual moving amount of the autonomous mobile body 100. As a result, the wheel moving amount is able to be compensated for more accurately by using the first reference moving amount estimated by using the plurality of position data.

In this preferred embodiment, the second estimating unit 5312 compensates for the calculated wheel moving amount using a compensation coefficient (described later) calculated in advance. For example, the second estimating unit 5312 multiplies the wheel moving amount by a compensation coefficient so as to be capable of compensating for the wheel moving amount. The compensation is made by using the compensation coefficient calculated in advance, so that calculating (measuring) frequencies of the second reference moving amount and the first reference moving amount to be used to compensate for the wheel moving amount are able to be reduced.

When the wheel moving amount is compensated for by using the compensation coefficient calculated in advance, the second estimating unit 5312 is able to estimate the moving amount of the autonomous mobile body 100 accurately based on the rotating amounts of the wheels 21a and 21b even while the autonomous mobile body 100 is moving in a location where the estimation of the position and the moving amount using the position data is difficult. Examples of such a location are a location where position data of a wide moving region where a wall or an obstacle is not present cannot be obtained, and a location where a change in a projection object image of a passage or the like defined by a linear wall hardly occurs.

The moving amount calculator 531 of this preferred embodiment further includes a compensation coefficient calculator 5313. The compensation coefficient calculator 5313 inputs the rotating amounts of the wheels 21a and 21b therein from the encoders of the motors 23a and 23b via a second obtaining command unit 5314b (described later) so as to calculate the second reference moving amount.

Further, the compensation coefficient calculator 5313 calculates the compensation coefficient as a result of comparing the second reference moving amount with the first reference moving amount based on the calculated second reference moving amount and the first reference moving amount input from the first estimating unit 5311. The compensation coefficient is able to be calculated as, for example, a ratio between the first reference moving amount and the second reference moving amount.

The compensation coefficient calculator 5313 stores the calculated compensation coefficient in the storage unit 51 or the like. The storage of the calculated compensation coefficient enables the second estimating unit 5312 to compensate for the wheel moving amount with reference to the compensation coefficient even when the second reference moving amount and the first reference moving amount are not calculated.

The moving amount calculator 531 of this preferred embodiment further includes a compensation data obtaining command unit 5314. The compensation data obtaining command unit 5314 determines the predetermined period. In this preferred embodiment, the compensation data obtaining command unit 5314 includes a first obtaining command unit 5314a and the second obtaining command unit 5314b.

The first obtaining command unit 5314a determines an input period of the position data to be input from the position data obtaining unit 3 into the first estimating unit 5311. Specifically, the first obtaining command unit 5314a connects the first estimating unit 5311 with the position data obtaining unit 3 only for the predetermined period. As a result, the first estimating unit 5311 is able to obtain the plurality of position data at start timing and end timing of the predetermined period.

On the other hand, the second obtaining command unit 5314*b* determines an input period of signals (pulse signals) to be input from the encoders of the motors 23*a* and 23*b* into the compensation coefficient calculator 5313. Specifically, the second obtaining command unit 5314*b* connects the encoders of the motors 23*a* and 23*b* with the compensation coefficient calculator 5313 only for the predetermined period. As a result, the compensation coefficient calculator 5313 is able to obtain the rotating amounts of the wheels 21*a* and 21*b* during the predetermined period.

For example, when the first obtaining command unit 5314*a* does not input position data because the position data obtaining unit 3 does not (cannot) detect an object around the autonomous mobile body 100, the first obtaining command unit 5314*a* and the second obtaining command unit 5314*b* may block the input of the position data into the first estimating unit 5311 and/or inputs of the pulse signals from the encoders of the motors 23*a* and 23*b* into the compensation coefficient calculator 5313.

Alternatively, the first obtaining command unit 5314*a* and the second obtaining command unit 5314*b* may operate independently or in synchronization with each other. Further, not limited to the time when the first obtaining command unit 5314*a* does not input position data, but it may repeat the input and blocking of the signals per set predetermined time. The first obtaining command unit 5314*a* and the second obtaining command unit 5314*b* can input and block the signals at suitable timings as necessary.

The operation of the autonomous mobile body 100 of this preferred embodiment is described below. The method for calculating the moving amount of the autonomous mobile body 100 in the first estimating unit 5311 is described first. As described above, the first estimating unit 5311 estimates the moving amount of the autonomous mobile body 100 using the plurality of position data obtained before and after the movement of the autonomous mobile body 100 (for example, a plurality of first position data obtained before the movement of the autonomous mobile body 100, and a plurality of second position data obtained after the movement).

The method for estimating the moving amount of the autonomous mobile body 100 using the plurality of position data is a method for, when either the plurality of first position data or the plurality of second position data is moved on a predetermined coordinate and is matched with the plurality of position data that is not moved, estimating the moving amount based on the plurality of position data that is moved. Such a moving amount estimating method includes an ICP (Iterative Closest Point) method and a histogram matching method.

The moving amount estimating method using the ICP method is described. The ICP method is a method for estimating the moving amount by searching for moving amounts of the plurality of second position data so that a first projection object image to be formed by the plurality of position data not to be moved (first position data) matches with a projection object image (a moving projection object image) to be formed by the plurality of position data to be moved (second position data).

Specifically, the moving amounts of the plurality of second position data are calculated so that the first projection object image matches with the second projection object image.

A distance between the moving projection object image to be formed by the plurality of moving position data to be calculated by moving the plurality of second position data and the first projection object image to be formed by the plurality of first position data is a calculated first. For example, a distance, which is calculated by summing up a predetermined number (for example, the number of the first position data) of distances between the one first position data and (one or a plurality of) moving position data corresponding to the one first position data, is able to be calculated as a distance between the moving projection object image and the first projection object image.

A determination is made whether the moving projection object image matches with the first projection object image based on a comparison of the distance between the moving projection object image and the first projection object image with a predetermined threshold. For example, when the distance between the two projection object images is the predetermined threshold or less, the determination is able to be made that the two projection object images match with each other. When the determination is made that the two projection object images match with each other, the moving amount of the plurality of moving position data forming the moving projection object image this time from the plurality of second position data is estimated as the moving amount of the autonomous mobile body 100.

On the other hand, when the two projection object images do not match with each other, the plurality of moving position data (the second position data) at this time is further moved, and a determination is made whether the distance between the two projection object images is calculated and the two projection object images match with each other. As a result, the moving position data (the second position data) are repeatedly moved until the determination is made that the two projection object images match with each other. The moving amount of the moving position data (the second position data) when the two projection object images do not match with each other can be determined based on, for example, a comparison of a result of calculating the distance between the two projection object images at this time with a result of calculating the distance between the two projection object images at a previous time.

The method for estimating the moving amount using the ICP method is schematically illustrated in FIG. 4. The plurality of first position data and the plurality of second position data are plotted on an X-Y coordinate system so that a first origin O as an origin of the first position data matches with a second origin O' as an origin of the second position data. In this case, the first projection object image (a solid line) and the second projection object image (a dotted line) are formed on the same coordinate as illustrated in (1) of FIG. 4. When the plurality of second position data (the moving position data) is moved parallelly from this state, the second origin O' is moved. When the plurality of second position data is movement rotationally, a coordinate (an X'-Y' coordinate) for defining the second position data tilts with respect to a coordinate (an X-Y coordinate) for defining the first position data.

As illustrated in (2) of FIG. 4, a distance between the first origin O and the second origin O' when the first projection object image matches with the moving projection object image corresponds to the moving distance of the parallel movement of the autonomous mobile body 100 (namely, an X coordinate of the second origin O' on the X-Y coordinate after the movement corresponds to the moving amount in an X direction, and a Y coordinate of the second origin O' on the X-Y coordinate after the movement corresponds to the moving amount in a Y direction). Further, a tilt angle of each axis (dotted lines) on the X'-Y' coordinate with respect to each corresponding axis (solid lines) on the X-Y coordinate corresponds to a change in a posture angle of the autonomous mobile body 100.

Figure 5:
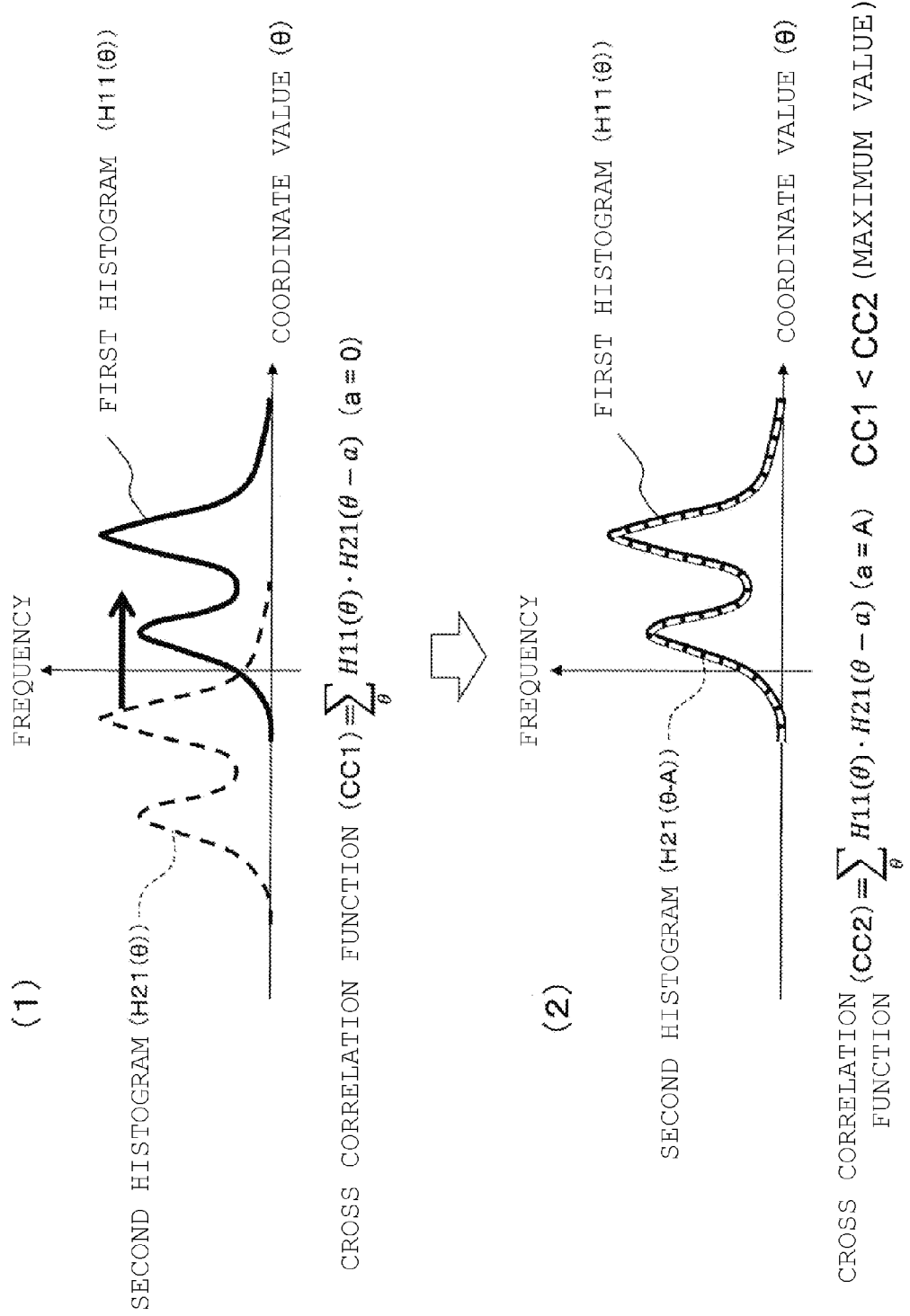
FIG. 5 is a diagram schematically illustrating a histogram matching method.

The moving amount estimating method using the histogram matching method is described below. The histogram matching method is, as illustrated in FIG. 5, a method for estimating an amount of shift of a first histogram or a second histogram from an original histogram as the moving amount of the autonomous mobile body 100 when a matching degree between the first histogram to be generated from coordinate values of the plurality of first position data and the second histogram to be generated from coordinate values of the plurality of second position data has a maximum value. FIG. 5 is a diagram schematically illustrating the moving amount estimating method using the histogram matching method. In this preferred embodiment, a value of a cross correlation function between the first histogram and the second histogram is calculated as the matching degree, but not limited to this, a value of a normalized cross correlation function or a value of a zero-mean normalized cross correlation function between the first histogram and the second histogram may be calculated as the matching degree.

Specifically, the moving amount is estimated as follows. A histogram representing an appearance frequency of an angle θ with respect to one axis (any axis) on the coordinate for defining position data of a straight line that connects one position data and position data adjacent to this one position data is generated first.

The cross correlation function of the two histograms calculated for the angle θ is, then, calculated as a value obtained by adding θ that enables H11 (θ)*H21 (θ−a) to be obtained (also said as an integral value of H11 (θ)*H21 (θ−a) with respect to θ). The value "a" corresponds to the shift amount of the histogram illustrated in FIG. 5.

Thereafter, the value "a" that makes the cross correlation function be the maximum value is calculated as a moving amount of the angle θ. The moving amount of the angle θ is a moving amount corresponding to a change in the posture angle of the autonomous mobile body 100.

Specifically, for example, in the calculated cross correlation function, the values of the cross correlation function are calculated for the values "a" to be obtained, and the value "a" when a largest value in the calculated values of the cross correlation function is estimated as the change in the posture angle of the autonomous mobile body 100.

A histogram representing an appearance frequency of the coordinate value of the position data is generated for each of the first position data and the position data (the moving position data) that is obtained by rotating the second position data by using the rotational moving amount (the change in the posture angle) calculated in the above manner, specifically for respective coordinate axes (the X axis and the Y axis in two dimensions, and the X axis, the Y axis and the Z axis in three dimension) of coordinates for defining the position data.

As a result, two histograms (H12(X), H13(Y)) (in two dimensions) are further generated for the first position data. On the other hand, two histograms (H22(X), H23(Y)) (in two dimensions) are generated for the moving position data.

Further, similarly to the above, a shift amount of the histogram for making a cross correlation function between the two histograms H12(X) and H22(X) representing the appearance frequency of the coordinate value of the X axis becomes the maximum value is estimated as the moving amount of the autonomous mobile body 100 in the X axial direction, and a shift amount of the histogram for making a cross correlation function between the two histograms H13(Y) and H23(Y) representing the appearance frequency of the coordinate value in the Y axis becomes the maximum value is estimated as the moving amount of the autonomous mobile body 100 in a Y axial direction.

Shifting of one histogram so that the two histograms representing the appearance frequencies of the coordinate values of the coordinate axes match with each other corresponds to moving of the plurality of second position data so that the second projection object image matches with the first projection object image as illustrated in FIG. 4. Specifically, the moving amount of the angle θ corresponds to the moving amount of the rotational movement such that the plurality of second position data matches with the plurality of first position data. The moving amount in the X axial direction and the moving amount in the Y axial direction correspond to the moving amount of the parallel movement so that the plurality of second position data matches with the plurality of first position data.

Further, it is also said that shifting of the second histogram corresponds to moving of the plurality of second position data and calculation of the plurality of position data.

In such a manner, the first estimating unit 5311 estimates the moving amount of the autonomous mobile body 100 based on a value (the distance between the two projection object images in the ICP method and the cross correlation function between the two histograms in the histogram matching method) that is calculated by using the plurality of position data according to the ICP method or the histogram matching method. As a result, even when (some of) the position data obtained by the position data obtaining unit 3 include a measurement error (caused by a noise or the like), the first estimating unit 5311 is able to reduce an influence of the measurement error and estimate the moving amount.

Further, the plurality of first position data and the plurality of second position data are obtained before and after the movement of the mobile body, respectively, namely, at a comparatively short time interval. For this reason, an environmental change problem that arises when an image present on the first projection object image is not present on the second projection object image or on the contrary an image not present on the first projection object image is present on the second projection object image hardly arises in the first estimating unit 5311.

The environmental change problem is a problem that arises when the moving amount and the position are estimated based on matching of map information obtained by the position data obtaining unit 3 using the SLAM method that estimates the moving amount and the position of the autonomous mobile body 100 based on a result of matching a local map with a global map.

For example, when an object present on the global map is not present on the local map and/or an object not present on the global map is present on the local map, even if a determination is made that the two maps (map information) match with each other in calculation, the estimated moving amount and position are very different from the actual moving amount and position in some cases.

When the first position data and the second position data are obtained at a short period, a change in ambient environment hardly occurs between the two position data. As a result, the first estimating unit 5311 is able to be estimate the moving amount accurately.

The method for calculating the compensation coefficient in the compensation coefficient calculator 5313 is described below with reference to FIG. 6. The compensation coefficient calculator 5313 calculates the compensation coefficient based on a comparison of a calculated value of the second reference moving amount calculated based on the rotating amounts of the wheels 21*a* and 21*b* at a predetermined period (to be determined by, for example, the position data and/or the input period of the rotating amounts of the wheels 21*a* and 21*b* in the compensation data obtaining command unit 5314) with a calculated value of the moving amount of the autonomous mobile body 100 in the first estimating unit 5311 at the predetermined period (namely, the first reference moving amount).

Specifically, the first obtaining command unit 5314*a* first can input position data into the first estimating unit 5311, and the second obtaining command unit 5314*b* can input pulse signals from the encoders of the motors 23*a* and 23*b* into the compensation coefficient calculator 5313 (step S1001).

At this time, the first estimating unit 5311 obtains the plurality of position data (corresponding to the first position data) before the movement of the autonomous mobile body 100 (at start timing of the predetermined period) from the position data obtaining unit 3 so as to store the plurality of position data in the storage unit 51.

On the other hand, the compensation coefficient calculator 5313 starts to input the pulse signals from the encoders of the motors 23*a* and 23*b*, and starts to measure the rotating amounts of the wheels 21*a* and 21*b* (step S1002).

Thereafter, the first estimating unit 5311 and the compensation coefficient calculator 5313 start to input the position data into the first estimating unit 5311, and determines whether a predetermined period passes after the rotating amounts of the wheels 21*a* and 21*b* (the pulse signals from the encoders) start to be input into the compensation coefficient calculator 5313 (step S1003).

When the predetermined period does not pass after the first position data starts to be obtained and the rotating amounts of the wheels 21*a* and 21*b* start to be input ("No" at step S1003), a process to calculate the compensation coefficient returns to step S1002 so that the compensation coefficient calculator 5313 continues to measure the rotating amounts of the wheels 21*a* and 21*b*.

On the other hand, when the determination is made that the predetermined period passes after the first position data starts to be obtained and the rotating amounts of the wheels 21*a* and 21*b* start to be input ("Yes" at step S1003), the first estimating unit 5311 obtains the plurality of position data (corresponding to the second position data) from the position data obtaining unit 3 so as to store the plurality of position data in the storage unit 51 (step S1004).

Thereafter, the first obtaining command unit 5314*a* of the compensation data obtaining command unit 5314 blocks the input of the position data into the first estimating unit 5311. Further, the second obtaining command unit 5314*b* blocks the input of the pulse signals from the encoders of the motors 23*a* and 23*b* into the compensation coefficient calculator 5313. As a result, a predetermined period to calculate the first reference moving amount and the second reference moving amount is determined.

After the pulse signals from the encoders of the motors 23*a* and 23*b* are blocked, the compensation coefficient calculator 5313 calculates the rotating amounts of the wheels 21*a* and 21*b* for the predetermined period based on pulse numbers included in the pulse signals for the predetermined period (step S1005). Specifically, the rotating amounts of the wheels 21*a* and 21*b* are able to be calculated based on a ratio between the pulse numbers in the pulse signals measured for the predetermined period and pulse numbers included in the pulse signals when the wheels 21*a* and 21*b* rotate once (a certain value that can be determined in advance).

Thereafter, the first estimating unit 5311 calculates the first reference moving amount as the moving amount in which the autonomous mobile body 100 moves for the predetermined period using the plurality of obtained first position data and the plurality of obtained second position data according to the method for estimating the moving amount of the autonomous mobile body 100 (step S1006).

On the other hand, the compensation coefficient calculator 5313 calculates the moving amount of the autonomous mobile body 100 moved by the wheels 21*a* and 21*b* during the predetermined period (the wheel moving amount) as the second reference moving amount based on the rotating amounts of the wheels 21*a* and 21*b* during the predetermined period (step S1007).

Specifically, the compensation coefficient calculator 5313 calculates the second reference moving amount based on the rotating amounts of the wheels 21*a* and 21*b* during the predetermined period and the predetermined circumferential lengths of the diameters of the wheels 21*a* and 21*b* (the reference wheel diameters) (namely, $\pi \times$ the reference wheel diameters).

The reference wheel diameters are diameters of the wheels 21*a* and 21*b* at a certain predetermined time point. The reference wheel diameters are, for example, the wheel diameters of the wheels 21*a* and 21*b* before use. It is, therefore, discovered that the second reference moving amount is the moving amount based on the hypothetical rotating amounts of the wheels 21*a* and 21*b* that are calculated without considering the diameter change of the wheels 21*a* and 21*b*.

After the first reference moving amount and the second reference moving amount are calculated, the compensation coefficient calculator 5313 calculates the compensation coefficient (step S1008).

In this preferred embodiment, the compensation coefficient calculator 5313 calculates a ratio between the first reference moving amount and the second reference moving amount (the first reference moving amount/the second reference moving amount) as the compensation coefficient. After the compensation coefficient is calculated, the compensation coefficient calculator 5313 stores the calculated compensation coefficient in the storage unit 51, and ends the process to calculate the compensation coefficient.

When the compensation coefficient calculator 5313 calculates the compensation coefficient using the first reference moving amount and the second reference moving amount so as to store it in the storage unit 51, the calculating frequencies of the second reference moving amount and the first reference moving amount are able to be reduced.

As an alternative preferred embodiment of the compensation coefficient calculating method, the compensation coefficient calculator 5313 may further multiply the ratio between the first reference moving amount and the second reference moving amount by an updated coefficient and use the obtained value as the compensation coefficient. In this case, the updated coefficient has a predetermined positive value smaller than 1, for example. As a result, the ratio between the first reference moving amount and the second reference moving amount changes more greatly than the ratio at the previous calculation, so that the moving amount obtained by the rotation of the wheels 21*a* and 21*b* is able to be prevented from being calculated as values that greatly vary by each calculation. The updated coefficient may have a predetermined positive value larger than 1. In this case, even when the ratio between the first reference moving amount and the second reference moving amount does not change more greatly than the ratio at the previous calculation, the moving amount can be compensated for more greatly (actively).

A specific operation of the autonomous mobile body 100 according to this preferred embodiment is described below with reference to FIG. 7. The following description is made on an operation when the autonomous mobile body 100 autonomously moves to a final target point while passing through a plurality of predetermined target points stored in the storage unit 51.

When the autonomous movement of the autonomous mobile body 100 starts, the compensation coefficient calculator 5313 checks if the compensation coefficient is to be calculated (step S1).

For example, when the compensation data obtaining command unit 5314 determines that the position data can be obtained and that the compensation coefficient can be calculated ("Yes" at step S1), the compensation coefficient calculator 5313 executes steps S1001 to S1008 so as to calculate the compensation coefficient (step S2). After the compensation coefficient calculator 5313 calculates the compensation coefficient, the autonomous moving process goes to step S3.

When the compensation coefficient is calculated at step S2, the compensation coefficient calculator 5313 adds a sum of calculated values of the moving amount of the autonomous mobile body 100 to date in the first estimating unit 5311 and the moving amount calculated from a sum of the rotating numbers of the wheels 21a and 21b to date to the first reference moving amount and the second reference moving amount calculated at steps S1006 and S1007 for the predetermined period. The added values may be used as a new first reference moving amount and a new second reference moving amount.

On the other hand, for example, when the compensation data obtaining command unit 5314 determines that position data cannot be obtained and the compensation coefficient cannot be calculated, or that the compensation coefficient is not to be calculated ("No" at step S1), the autonomous moving process goes to step S3.

After the compensation coefficient is calculated or the determination is made that the compensation coefficient cannot be calculated (or the compensation coefficient is not to be calculated), the second estimating unit 5312 starts to input pulse signals from the encoders of the motors 23a and 23b. That is, the second estimating unit 5312 starts to measure the rotating amounts of the wheels 21a and 21b (step S3).

When the position data obtaining unit 3 obtains the position data at step S3 (namely, the first obtaining command unit 5314a can input the position data into the first estimating unit 5311), the first estimating unit 5311 may obtain the plurality of position data.

During the measurement of the rotating amounts of the wheels 21a and 21b, the second estimating unit 5312 determines whether a constant time passes after the measurement of the rotating amounts of the wheels 21a and 21b starts (step S4). The constant time is a timing, for example, at which the estimation of the current position, described later, is necessary (for example, a control cycle) that can be arbitrarily determined as necessary.

When the constant time does not pass after the measurement of the rotating amounts of the wheels 21a and 21b starts ("No" at step S4), the autonomous moving process returns to step S3, so that the rotating amounts of the wheels 21a and 21b continue to be measured.

On the other hand, when the determination is made that the constant time passes after the measurement of the rotating amounts of the wheels 21a and 21b starts ("Yes" at step S4), the second estimating unit 5312 calculates the moving amount of the autonomous mobile body 100 (the wheel moving amount) based on the rotating amounts of the wheels 21a and 21b (step S5).

Specifically, the second estimating unit 5312 first calculates the rotating amounts of the wheels 21a and 21b until the passage of the constant time after the start of the measurement of the rotating amounts based on the pulse numbers of the pulse signals input for the period. The second estimating unit 5312, then, calculates the wheel moving amount based on the calculated rotating amounts of the wheels 21a and 21b, and peripheral lengths of the reference wheel diameters of the wheels 21a and 21b (namely, $\pi \times$ the reference wheel diameters).

When the first estimating unit 5311 obtains the plurality of position data at step S3, the first estimating unit 5311 may obtain the plurality of position data from the position data obtaining unit 3 also at step S5. In this case, the first estimating unit 5311 may calculate the moving amount of the autonomous mobile body 100 for the constant time using the plurality of position data obtained before and after the movement of the autonomous mobile body 100 for the constant time according to the moving amount calculating method in the first estimating unit 5311, described above.

After the wheel moving amount is calculated, the second estimating unit 5312 compensates for the wheel moving amount calculated at step S5 (step S6). In this preferred embodiment, the second estimating unit 5312 multiplies the wheel moving amount calculated at step S5 by the compensation coefficient calculated at step S2 so as to compensate for the wheel moving amount. As a result, the second estimating unit 5312 compensates for the wheel moving amount calculated at step S5 based on the comparison between the second reference moving amount and the first reference moving amount calculated at step S2, so as to be capable of calculating the compensated wheel moving amount as the moving amount of the autonomous mobile body 100 moved for the constant time.

After the moving amount of the autonomous mobile body 100 moved for the constant time is calculated, the position estimating unit 55 inputs the moving amount calculated at step S6 from the moving amount estimating unit 53, and estimates the current position of the autonomous mobile body 100 based on the input moving amount using the method for estimating the position of the autonomous mobile body 100 according to the above-described map matching (step S7).

After the current position of the autonomous mobile body 100 is estimated, the travelling controller 57 calculates driving signals to move the autonomous mobile body 100 from the current position to a next target position, and outputs the driving signal to the motors 23a and 23b of the travelling unit 2 (step S8).

Specifically, the travelling controller 57 inputs the current position of the autonomous mobile body 100 estimated at step S7 from the position estimating unit 55. Further, the travelling controller 57 reads the next target position from the storage unit 51 based on the input current position. Thereafter, the travelling controller 57 calculates a control command to move the autonomous mobile body 100 to the read next target position from the current position of the autonomous mobile body 100.

The control command to be calculated by the travelling controller 57 is calculated as data representing, for example, a relationship between a time during a movement from a current position to a next target position and the speed of the autonomous mobile body 100 (rotational speeds of the wheels 21a and 21b, namely, rotational speeds of the motors 23a and 23b).

After the calculation of the control command, the travelling controller 57 calculates driving signal to drive (controlling) the motors 23a and 23b based on the calculated control command, and outputs the calculated driving signals to the motors 23a and 23b of the travelling unit 2.

After the driving signals are output to the travelling unit 2, the controller 5 determines whether, for example, the autonomous mobile body 100 passes through all the target positions stored in the storage unit 51, so as to determine whether the autonomous movement is to be ended (step S9).

For example, when the determination is made that the autonomous mobile body 100 does not pass through all the target positions and the autonomous movement is to be continued ("No" at step S9), the autonomous moving process returns to step S1 so that the autonomous movement is continued.

On the other hand, when the determination is made that the autonomous mobile body 100 passes through all the target positions and the autonomous movement is to be ended ("Yes" at step S9), the autonomous moving process is ended.

In the moving amount estimating unit 53 of the first preferred embodiment, when the first projection object image to be formed by the plurality of first position data matches with the moving projection object image to be formed by the plurality of moving position data, the moving amount of the parallel movement and/or the moving amount of the rotational movement of the second position data in which the moving position data is obtained is determined as the first reference moving amount. In other words, the moving amount, in which the projection object image to be formed by the plurality of second position data is moved so as to match with the first projection object image, is determined as the first reference moving amount. Therefore, an influence of a measurement error included in the plurality of position data is reduced or prevented, so that the first reference moving amount is able to be calculated as a value closer to the actual moving amount of the mobile body.

As a result, the second estimating unit 5312 is able to compensate for the wheel moving amount more accurately using the first reference moving amount calculated by reducing the influence of the measurement error included in the plurality of position data.

In the moving amount estimating unit 53 of the first preferred embodiment, the compensation coefficient calculator 5313 calculates the compensation coefficient based on the first reference moving amount and the second reference moving amount. Further, the second estimating unit 5312 compensates for the wheel moving amount using the compensation coefficient calculated as the result of comparing the first reference moving amount with the second reference moving amount.

As a result, in the moving amount estimating unit 53, the calculation frequencies of the second reference moving amount and the first reference moving amount are significantly reduced. Further, even when the plurality of position data cannot be obtained while the autonomous mobile body 100 is travelling on a wide area where an obstacle such as a wall is not present therearound, the second estimating unit 5312 is able to compensate for the wheel moving amount more accurately using the compensation coefficient and to calculate the moving amount of the autonomous mobile body 100 more accurately.

Further, the moving amount estimating unit 53 of the autonomous mobile body 100 of this preferred embodiment estimates the moving amount of the autonomous mobile body 100 more accurately. Accordingly, the position estimating unit 55 is able to estimate the position of the autonomous mobile body 100 more accurately. As a result, the travelling controller 57 controls the travelling unit 2 so that the autonomous mobile body 100 is appropriately moved from the current position to a predetermined target position. That is, the autonomous mobile body 100 includes the moving amount estimating unit 53 so that the autonomous mobile body 100 autonomously travels on an intended moving route accurately.

Figure 6:
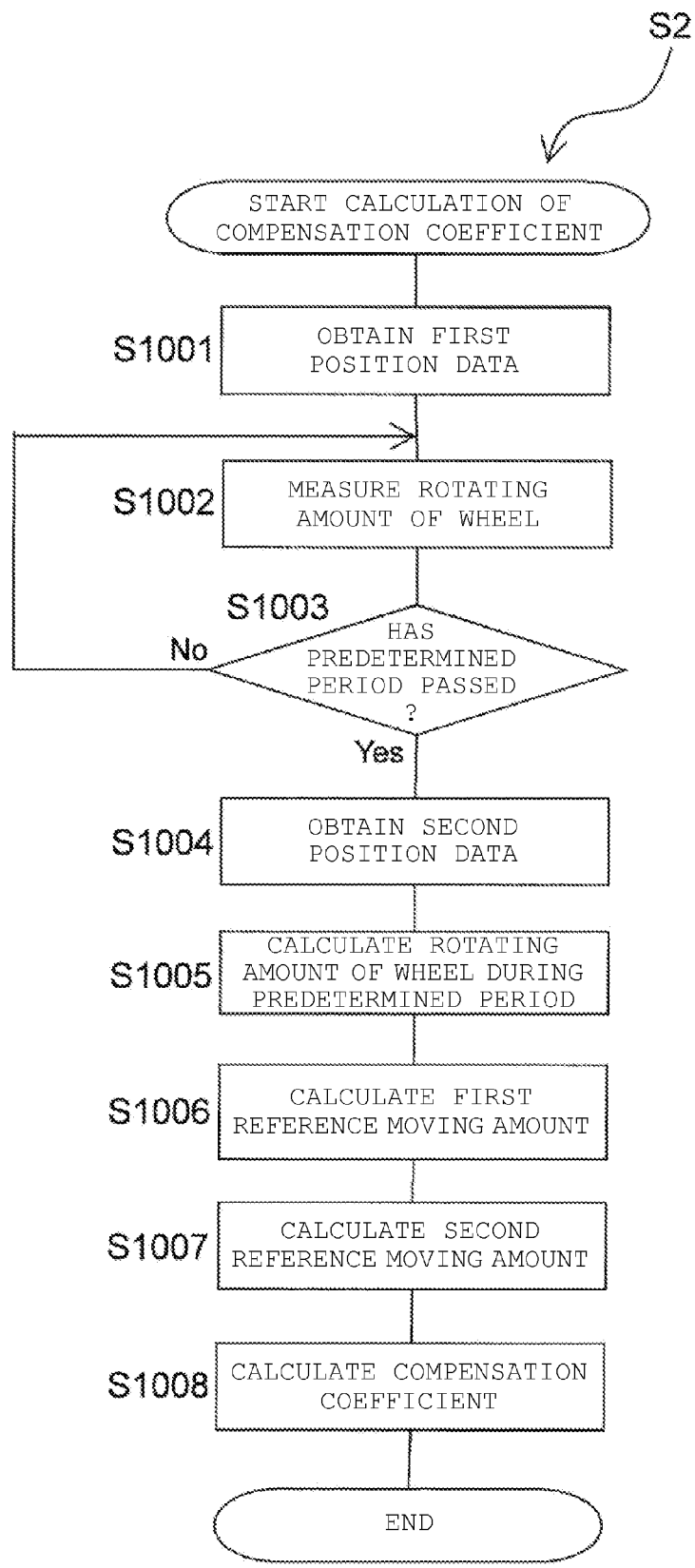
FIG. 6 is a flowchart illustrating a method for calculating a compensation coefficient.
Figure 7:
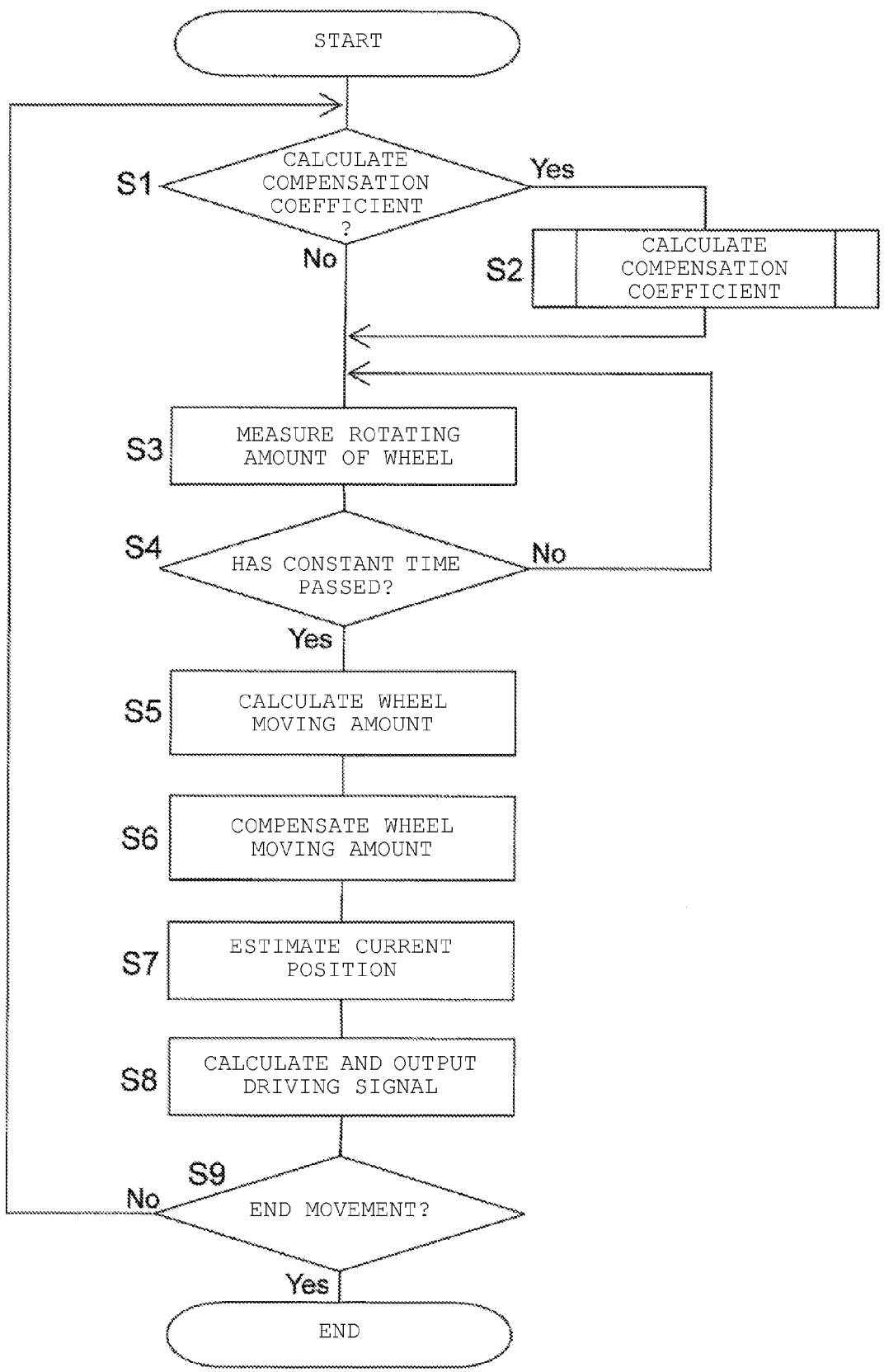
FIG. 7 is a flowchart illustrating an operation of the autonomous mobile body.

In the method for calculating the compensation coefficient and the method for autonomously moving the autonomous mobile body 100 as illustrated in the flowcharts of FIG. 6 and FIG. 7, an order of the steps can be arbitrarily changed or the process at each step can be changed within the scope of the present invention.

For example, as an alternative preferred embodiment of the present invention, the compensation coefficient calculator 5313 may calculate a difference between the first reference moving amount and the second reference moving amount as the compensation coefficient. In this case, the second estimating unit 5312 compensates for the wheel moving amount such that the wheel moving amount is not multiplied by the compensation coefficient but the compensation coefficient is added to the wheel moving amount.

Second Preferred Embodiment

The moving amount calculator 531 of the first preferred embodiment preferably does not check whether the compensation coefficient calculated by the compensation coefficient calculator 5313 is appropriately calculated. However, the method is not limited to this. A moving amount calculator 531' of the second preferred embodiment evaluates whether a compensation coefficient calculated by a compensation coefficient calculator 5313 is appropriate.

Figure 8:
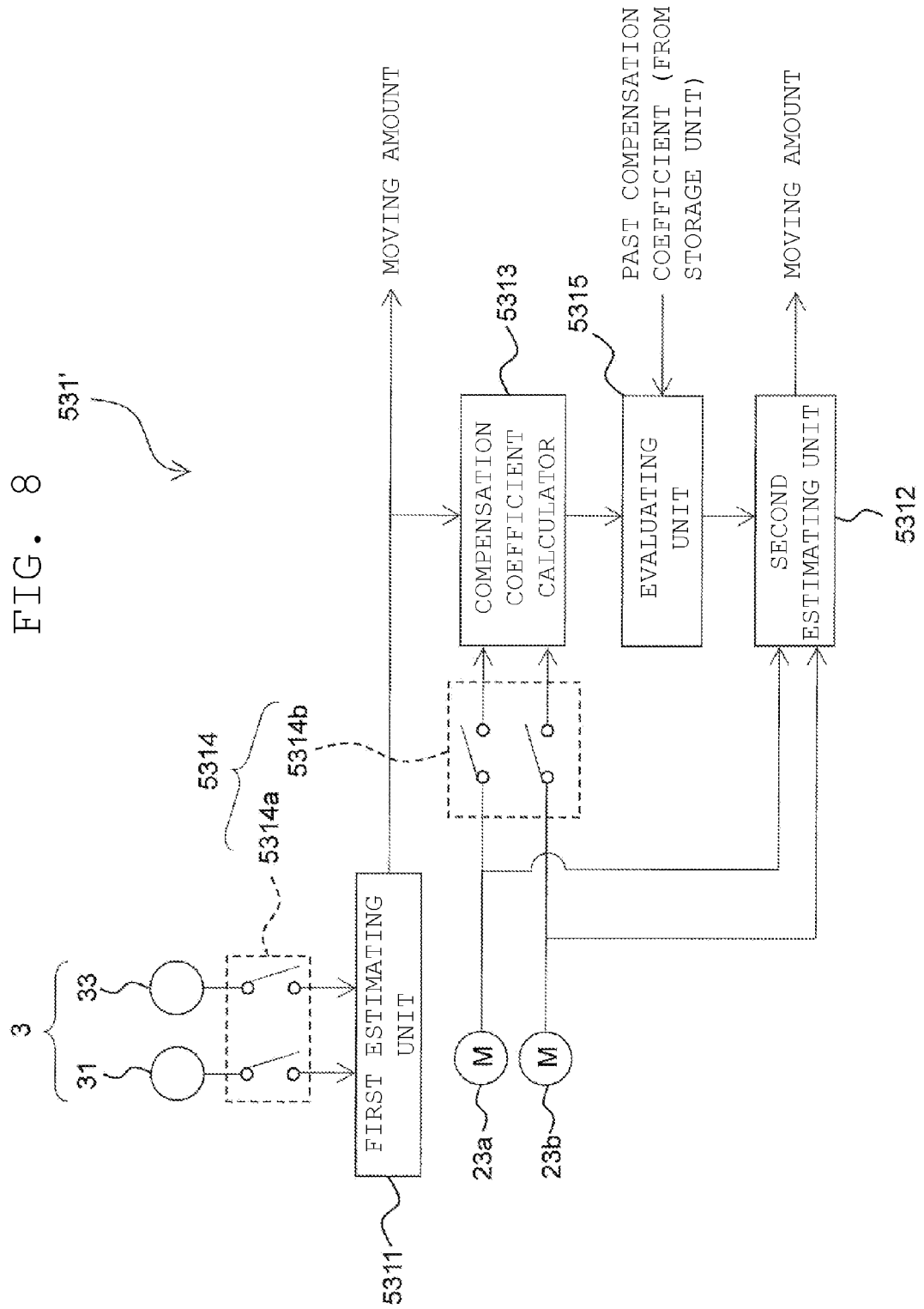
FIG. 8 is a diagram illustrating a configuration of a moving amount calculator according to a second preferred embodiment of the present invention.

For this reason, as illustrated in FIG. 8, the moving amount calculator 531' of the second preferred embodiment includes a first estimating unit 5311, a second estimating unit 5312, the compensation coefficient calculator 5313, a compensation data obtaining command unit 5314 (e.g., a compensation data obtaining commander), and an evaluating unit 5315 (e.g., an evaluator). FIG. 8 is a diagram illustrating a configuration of the moving amount calculator according to the second preferred embodiment.

The first estimating unit 5311, the second estimating unit 5312, the compensation coefficient calculator 5313, and the compensation data obtaining command unit 5314 of the moving amount calculator 531' in the second preferred embodiment preferably have the same configurations and functions as those of the first estimating unit 5311, the second estimating unit 5312, the compensation coefficient calculator 5313, and the compensation data obtaining command unit 5314 in the first preferred embodiment. For this reason, description thereof is omitted. Further, since also a configuration of an autonomous mobile body 100 is the same as that in the first preferred embodiment except for the configuration of the moving amount calculator 531, description thereof is omitted. For this reason, the following description refers only to the evaluating unit 5315.

The evaluating unit 5315 evaluates whether the compensation coefficient at this time is appropriately calculated based on a result of comparing the compensation coefficient calculated by the compensation coefficient calculator 5313 at this time with a compensation coefficient that is calculated for a past period in the compensation coefficient calculator 5313 and is stored in a storage unit 51 (referred to as a past compensation coefficient).

When the compensation coefficient is calculated as a ratio between a first reference moving amount and a second reference moving amount and the compensation coefficient calculated at this time is larger than "1", the evaluating unit 5315 evaluates that the compensation coefficient calculated at this time is calculated inappropriately. The compensation coefficient is evaluated in such a manner for the following reason.

When the compensation coefficient is calculated as a difference between the first reference moving amount and the second reference moving amount, the evaluating unit 5315 evaluates that the compensation coefficient calculated at this time is inappropriate when the compensation coefficient calculated at this time is a positive value (the first reference moving amount is larger than the second reference moving amount).

When the autonomous mobile body 100 is moved on a floor surface by the travelling unit 2 having wheels 21a and 21b, diameters of the wheels 21a and 21b typically reduce per travelling. In this preferred embodiment, a state of the compensation coefficient being larger than "1" means a state of the diameters of the wheels 21a and 21b being larger than diameters of the wheels 21a and 21b at an unused time. For this reason, the compensation coefficient larger than "1" conflicts with the reduction in the diameters of the wheels 21a and 21b in response to a travelling distance. When a general phenomenon conflicts with the calculated compensation coefficient in such a manner, the compensation coefficient is evaluated as being calculated inappropriately.

Further, a state of the compensation coefficient calculated at this time becoming larger than the compensation coefficient calculated at a past time conflicts with a state of the diameters of the wheels 21a and 21b being reduced per travelling (per use) except for a case where the wheels 21a and 21b are replaced by new ones while the compensation coefficient at a past time is calculated and the compensation coefficient at this time is calculated. Therefore, also when the compensation coefficient calculated at this time becomes larger than the compensation coefficient at the past time, the evaluating unit 5315 evaluate that the compensation coefficient at this time is inappropriately calculated.

A moving amount estimating unit 53 includes the evaluating unit 5315, so that a determination can be made whether the compensation coefficient calculated at this time is reasonably calculated based on characteristics of the wheels 21a and 21b in comparison with the past compensation coefficient calculated at a previous time or in consideration for a general phenomenon that happens in the travelling unit 2.

Further, when the evaluating unit 5315 evaluates that the compensation coefficient is not appropriately calculated, the past compensation coefficient stored in the storage unit 51 is output as the compensation coefficient calculated at this time to the second estimating unit 5312. That is, when the compensation coefficient at this time is evaluated as not being appropriately calculated, the second estimating unit 5312 uses the past compensation coefficient as the compensation coefficient calculated at this time.

As a result, when the compensation coefficient calculated at this time is calculated as a wrong (unreasonable) value, the second estimating unit 5312 is able to avoid erroneous compensation of the wheel moving amount using the compensation coefficient erroneously calculated.

Third Preferred Embodiment

In the moving amount calculators 531 and 531' of the first preferred embodiment and the second preferred embodiment, the second estimating unit 5312 calculates the wheel moving amount based on the peripheral lengths calculated based on the reference wheel diameters of the wheels 21a and 21b and the rotating amounts of the wheels 21a and 21b, and compensates for the wheel moving amount using the compensation coefficient. However, a subject to be compensated for is not limited to the wheel moving amount.

Figure 9:
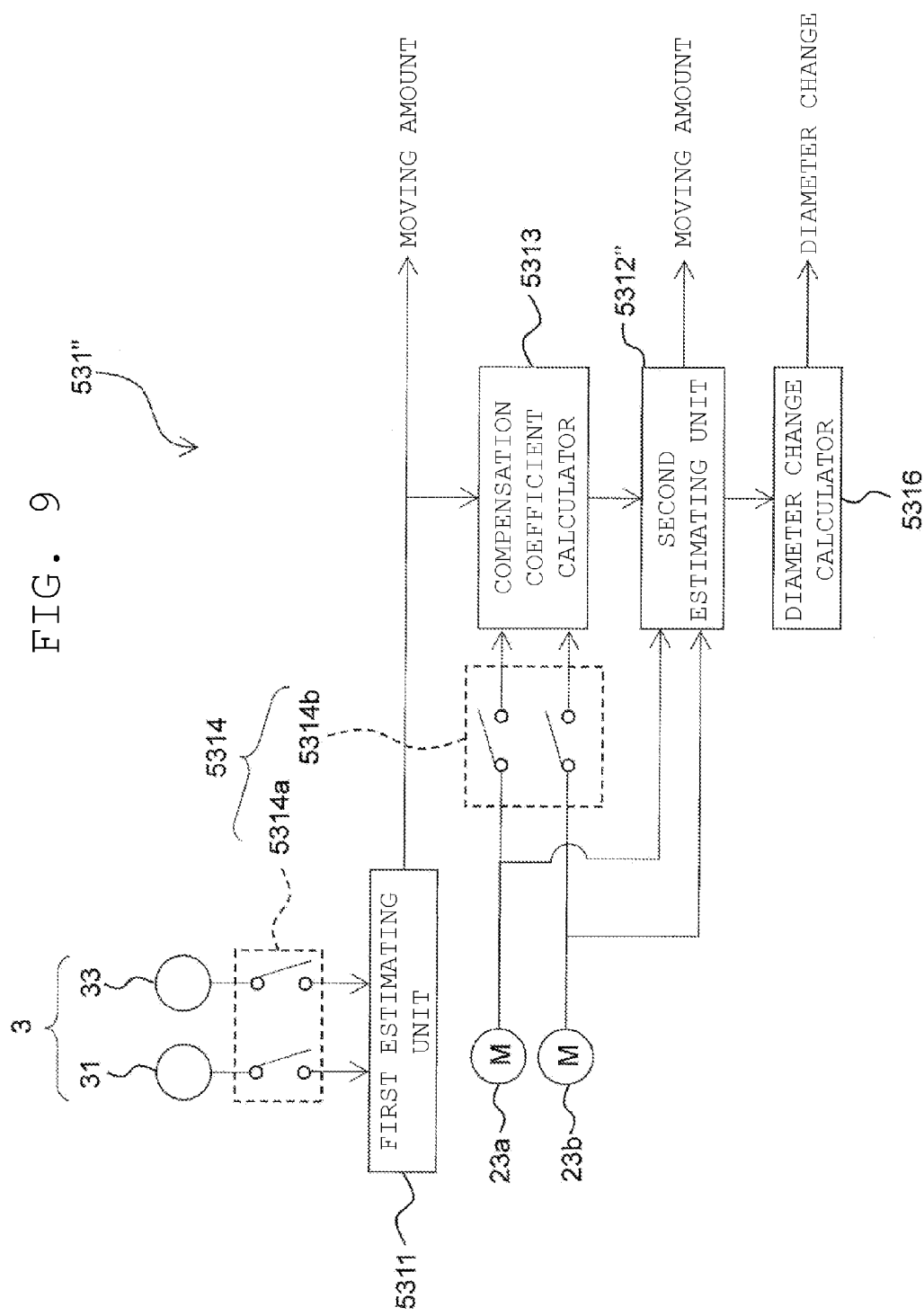
FIG. 9 is a diagram illustrating a configuration of a moving amount calculator according to a third preferred embodiment of the present invention.

In a moving amount calculator 531" of a third preferred embodiment, not a wheel moving amount but wheel diameters of wheels 21a and 21b are compensated for. The moving amount calculator 531" of the third preferred embodiment, as illustrated in FIG. 9, includes a first estimating unit 5311, a second estimating unit 5312", a compensation coefficient calculator 5313, a compensation data obtaining command unit 5314, and a diameter change calculator 5316.

In the third preferred embodiment, the first estimating unit 5311, the compensation coefficient calculator 5313, and the compensation data obtaining command unit 5314 preferably have the same configurations and functions as those of the first estimating unit 5311, the compensation coefficient calculator 5313, and the compensation data obtaining command unit 5314 of the first preferred embodiment and the second preferred embodiment. For this reason, description of the first estimating unit 5311, the compensation coefficient calculator 5313, and the compensation data obtaining command unit 5314 of the third preferred embodiment is omitted.

The second estimating unit 5312" compensates for the wheel diameters of the wheels 21a and 21b based on reference wheel diameters and a compensation coefficient. For example, the second estimating unit 5312" multiplies the reference wheel diameters by the compensation coefficient (when the compensation coefficient is calculated as a ratio between a first reference moving amount and a second reference moving amount) so as to be capable of compensating the wheel diameters of the wheels 21a and 21b.

On the other hand, when the compensation coefficient is calculated as a difference between the first reference moving amount and the second reference moving amount, the second estimating unit 5312" adds a change amount of the wheel diameters (wheel diameters to be calculated when the compensation coefficient is set as the wheel moving amount) to the reference wheel diameters so as to be capable of compensating the wheel diameters of the wheels 21a and 21b.

Further, the second estimating unit 5312" calculates current peripheral lengths of the wheels 21a and 21b based on the compensated wheel diameters (referred to as compensation wheel diameters). Further, the second estimating unit 5312" calculates the wheel moving amount (namely, the moving amount of an autonomous mobile body 100) based on the current peripheral lengths and the rotating amounts of the wheels 21a and 21b. As a result, the moving amount of the autonomous mobile body 100 to be calculated based on the rotating amounts of the wheels 21a and 21b is able to be compensated for and simultaneously the wheel diameters is also able to be compensated for.

The diameter change calculator 5316 calculates a change in the diameters of the wheels 21a and 21b based on a comparison between the compensation wheel diameters and the reference wheel diameters. For example, a value obtained by subtracting the compensation wheel diameters from the reference wheel diameters as a reduction amount of the diameters of the wheels 21a and 21b. As to the other portions, the ratio between the reference wheel diameters and the compensation wheel diameters may be calculated as the reduction amount of the diameters of the wheels 21a and 21b.

When the compensation coefficient is calculated as the difference between the first reference moving amount and the second reference moving amount, wheel diameters to be calculated when the compensation coefficient is used as the wheel moving amount is able to be determined as the change in the diameters of the wheels 21a and 21b.

The moving amount calculator 531" includes the diameter change calculator 5316 so that the change in the diameters of the wheels 21a and 21b is able to be monitored. As a result, for example, when the diameters of the wheels 21a and 21b are reduced to a predetermined value or less, a user can be notified about a time of replacement of the wheels 21a and 21b in a manner that an alarm that prompts replacement of the wheels 21a and 21b is generated or a message to prompt the replacement of the wheels 21a and 21b is displayed on a display unit (not illustrated) of the operation unit 7.

Other Preferred Embodiments

The preferred embodiments of the present invention are described above, but the present invention is not limited to the above preferred embodiments, and various modifications can be made within a range that does not deviate from the subject matter of the present invention. In particular, the plurality of preferred embodiments and alternative preferred embodiments described in this specification can be arbitrarily combined as needed.

For example, all the first to third preferred embodiments may be combined. In this case, a moving amount estimating unit 53''' may include a first estimating unit 5311, second estimating units 5312 and 5312", a compensation coefficient calculator 5313, a compensation data obtaining command unit 5314, an evaluating unit 5315, and a diameter change calculator 5316. As a result, the moving amount estimating unit 53''' is able to produce all the effects of the moving amount calculators 531, 531', and 531" according to the first to third preferred embodiments.

Another Preferred Embodiment of Travelling Unit

The travelling unit 2 according to the first to third preferred embodiments preferably is a two-wheel differential travelling unit. However, not limited to this, use of a travelling unit that has another kind of wheels such as omni wheels can produce the effects of the first to third preferred embodiments.

Another Preferred Embodiment of Moving Amount Calculating Method in First Estimating Unit In the first estimating unit 5311 of the first to third preferred embodiments, any one of the ICP method and the histogram matching method is preferably used so that the moving amount of the autonomous mobile body 100 is calculated. However, not limited to this, the ICP method and the histogram matching method may be combined so that the moving amount is calculated. For example, a moving amount of the rotational movement of the autonomous mobile body 100 (a change amount of a posture) may be calculated by using the histogram matching method, and a moving amount of the autonomous mobile body 100 (a parallel moving amount) may be calculated by using the ICP method.

The ICP method enables the accurate calculation of the moving amount of the autonomous mobile body 100 but has the following problem. That is, when only the posture of the autonomous mobile body 100 is changed and the posture change amount is calculated by using the ICP method, the moving amount is occasionally calculated in a state that a center point of the posture change shifts before and after the movement. That is, the autonomous mobile body 100 is estimated as being moved parallelly even though it does not moved parallelly. On the other hand, the rotating center hardly moves in the histogram matching method.

Therefore, the posture change amount of the rotational movement of the autonomous mobile body 100 is calculated by using the histogram matching method, and the plurality of second position data is moved by the posture change amount estimated by using the histogram matching method, and the parallel moving amount is calculate by using the second position data and the first position data after the movement according to the ICP method. As a result, the moving amount of the autonomous mobile body 100 is able to be calculated more accurately.

Further, since a calculating amount necessary to calculate the moving amount in the ICP method tends to be larger, the ICP method and the histogram matching method are combined so that a calculating amount necessary to calculate the moving amount in the first estimating unit 5311 is able to be reduced.

Further, when a moving amount is calculated by using a plurality of position data, the plurality of position data is classified into some groups determined base on predetermined conditions, and the moving amount is calculated by using position data included in one group. Thereafter, the plurality of second position data is moved by the moving amount, and a moving amount is further calculated by using position data included in another group. That is, the moving amount may be calculated at multiple-stage. As a result, particularly in the ICP method, the calculating amount necessary to calculate the moving amount is able to be reduced.

Another Preferred Embodiment of Main Body

The main body 1 of the autonomous mobile body 100 according to the first to third preferred embodiments is not particularly mounted with a member that interferes with a position data detectable region of the position data obtaining unit 3. However, not limited to this, the main body 1 may be mounted with a known-shaped interference member so that at least a portion of the member enters the position data detectable region of the position data obtaining unit 3.

The main body 1 is mounted with the interference member so that at least a portion of the member enters the position data detectable region, so that a check can be made whether the position data obtaining unit 3 normally operates. For example, when an object such as a wall or an obstacle is not present around the autonomous mobile body 100 and a projection object image corresponding to the shape of the portion of the interference member is formed by some of the plurality of position data, the determination can be made not that position data are not obtained due to a malfunction of the position data obtaining unit 3 but that the autonomous mobile body 100 is moving in a wide space where no object is present.

Another Preferred Embodiment of Use of Compensation Coefficient

In the first to third preferred embodiments, the compensation coefficient calculated by the compensation coefficient calculator 5313 is used to compensate for wheel moving amounts or diameters of wheels 21a and 21b. However, not limited to this, the compensation coefficient may be used to check a state of the floor surface in the moving region.

For example, in a preferred embodiment where the compensation coefficient calculator 5313 calculates the compensation coefficient as a ratio between a first reference moving amount and a second reference moving amount, when the calculated compensation coefficient is a small value, a determination is able to be made that the floor surface in the moving region is wet or a lot of objects such as sand that make the autonomous mobile body 100 skid are present on the floor surface. This is because when the floor surface is wet or is slippery due to sand the actual moving amount of the autonomous mobile body 100 is small even if the wheels 21a and 21b rotate a lot.

For example, when the autonomous mobile body 100 according to the first to third preferred embodiments is applied to a cleaning robot, a location to be cleaned is able to be determined based on the compensation coefficient. For example, the cleaning robot is able to be instructed to intensively clean a location where the calculated compensation coefficient is a small value. In a preferred embodiment where the compensation coefficient calculator 5313 calculates the compensation coefficient as the difference between the first reference moving amount and the second reference moving amount, a case where an absolute value of the compensation coefficient is calculated as a large value is detected so that the same effect as the above one is able to be produced.

In another manner, the compensation coefficient calculated by the compensation coefficient calculator 5313 and the change amount of the wheel diameters calculated by the diameter change calculator 5316 are saved in a storage medium inside and/or outside the autonomous mobile body 100, and the saved compensation coefficient and change amount of the wheel diameters may be read to be used when the autonomous mobile body 100 is activated next time. As a result, the predetermined period for again calculating the compensation coefficient and the diameter change amount is not necessary, and thus the moving amount and the wheel diameters is able to be compensated for instantly.

In the second preferred embodiment, the compensation coefficient calculated by the compensation coefficient calculator 5313 is evaluated only by the evaluating unit 5315, but the compensation coefficient may be reevaluated based on a result of map matching in the SLAM method. For example, the wheel moving amount compensated for by the second estimating unit 5312 is compared with an estimated moving amount of the map matching (corresponding to a difference between a self position of the autonomous mobile body 100 before a movement and a self position of the autonomous mobile body 100 after the movement estimated by the map matching). When an absolute error between the wheel moving amount before the compensation and the estimated moving amount of the map matching is small and an absolute error between the compensated wheel moving amount and the estimated moving amount of the map matching is large, the compensation coefficient calculated by the compensation coefficient calculator 5313 may be determined as being inappropriate.

Further, the compensation coefficient and/or the diameter change may be recalculated based on the comparison between the wheel moving amount and the estimated moving amount of the map matching. As a result, the evaluation is able to be further made whether the compensation coefficient calculated by the compensation coefficient calculator 5313 is appropriate. Alternatively, the compensation coefficient is able to be evaluated also by using the estimated moving amount of the map matching (namely, the wheel moving amount can be compensated for) as needed.

In another manner, as modes of the map matching based on the second reference moving amount (the wheel moving amount) and the map matching based on the moving amounts compensated for by the second estimating units 5312 and 5312", a matching degree of the map matching based on the wheel moving amount (a maximum value of a posterior probability or the like) is compared with a matching degree of the map matching based on the moving amounts compensated for by the second estimating units 5312 and 5312" (maximum value of the posterior probability). When the matching degree of the map matching based on the moving amount compensated for by the second estimating units 5312 and 5312" is small, the compensation coefficient calculated by the compensation coefficient calculator 5313 may be determined as inappropriate.

As a result, an evaluation is able to be further made whether the compensation coefficient calculated by the compensation coefficient calculator 5313 is appropriate. The posterior probability is an index representing a level of the matching result, and as the result of map matching is better, namely, the position is estimated more accurately, the value becomes larger.

In the above preferred embodiments, a moving amount of the autonomous mobile body 100 on a two-dimensional plane is estimated by using LRF that obtains two-dimensional position data as the position data obtaining unit, but a moving amount of the autonomous mobile body 100 in a three-dimensional space is also able to be estimated by using a ToF camera or the like that is able to obtain a three-dimensional position data.

Various preferred embodiments of the present invention is able to be widely applied to any mobile body that is able to be moved by rotation of a wheel.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A moving amount estimating apparatus for estimating a moving amount of a mobile body moving according to rotation of a wheel, the apparatus comprising:
   a position data detector that obtains a plurality of position data to form a projection object image obtained by projecting an object around the mobile body onto a predetermined coordinate; and
   a processor configured or programmed to include:
      a first estimator that calculates, when a first projection object image formed by a plurality of first position data obtained one of before and after the mobile body moves matches with a moving projection object image formed by a plurality of moving position data obtained by a parallel movement and/or a rotational movement of a plurality of second position data obtained the other of before and after the movement on the predetermined coordinate, a moving amount of the parallel movement and/or a moving amount of the rotational movement of the plurality of second position data as a moving amount in which the mobile body moves;

a second estimator that compensates for a wheel moving amount to be calculated based on a rotating amount of the wheel based on a comparison between a second reference moving amount calculated based on the rotating amount of the wheel for a predetermined period during which the mobile body is moving and a first reference moving amount that is a calculated value of the moving amount in the first estimator when the mobile body moves during the predetermined period so as to estimate the compensated wheel moving amount as the moving amount of the mobile body; and a compensation coefficient calculator that calculates a compensation coefficient as a result of comparing the second reference moving amount with the first reference moving amount based on the first reference moving amount and the second reference moving amount; wherein the second estimator compensates for the wheel moving amount using the compensation coefficient, and calculates a compensation wheel diameter based on a reference wheel diameter as a predetermined diameter of the wheel and the compensation coefficient so as to calculate the moving amount of the mobile body based on the compensation wheel diameter and the rotating amount of the wheel.

2. The moving amount estimating apparatus according to claim 1, wherein the processor is further configured or programmed to include an evaluator that evaluates whether the compensation coefficient is calculated appropriately based on a result of comparing a past compensation coefficient calculated during a past period before the predetermined period with the compensation coefficient.

3. The moving amount estimating apparatus according to claim 2, wherein when a determination is made that the compensation coefficient is not appropriately calculated, the second estimator uses the past compensation coefficient as the compensation coefficient.

4. The moving amount estimating apparatus according to claim 1, wherein the compensation coefficient calculator calculates the compensation coefficient based on the first reference moving amount, the second reference moving amount, and an updated coefficient having a predetermined value.

5. The moving amount estimating apparatus according to claim 1, wherein the second estimator calculates the wheel moving amount based on a reference wheel diameter as a predetermined diameter of the wheel and the rotating amount of the wheel so as to compensate for the wheel moving amount based on the compensation coefficient.

6. The moving amount estimating apparatus according to claim 1, wherein the processor is further configured or programmed to include a diameter change calculator that calculates a change in the diameter of the wheel based on a comparison between the compensation wheel diameter and the reference wheel diameter.

7. The moving amount estimating apparatus according to claim 1, wherein the processor is further configured or programmed to include a compensation data obtaining commander that specifies the predetermined period in which the first reference moving amount and the second reference moving amount are calculated.

8. An autonomous mobile body comprising:
a travelling unit that includes a wheel and is capable of travelling according to rotation of the wheel;
a position data detector that obtains a plurality of position data to form a projection object image obtained by projecting an object around the mobile body onto a predetermined coordinate; and
a processor configured or programmed to include:
a first estimator that calculates, when a first projection object image formed by a plurality of first position data obtained one of before and after the mobile body moves matches with a moving projection object image formed by a plurality of moving position data obtained by a parallel movement and/or a rotational movement of a plurality of second position data obtained the other of before and after the movement on the predetermined coordinate, a moving amount of the parallel movement and/or a moving amount of the rotational movement of the plurality of second position data as a moving amount in which the mobile body moves;
a second estimator that compensates for a wheel moving amount to be calculated based on a rotating amount of the wheel based on a comparison between a second reference moving amount calculated based on the rotating amount of the wheel for a predetermined period during which the mobile body is moving and a first reference moving amount that is a calculated value of the moving amount in the first estimator when the mobile body moves during the predetermined period so as to estimate the compensated wheel moving amount as the moving amount of the mobile body;
a compensation coefficient calculator that calculates a compensation coefficient as a result of comparing the second reference moving amount with the first reference moving amount based on the first reference moving amount and the second reference moving amount;
a position estimator that estimates a current position based on a moving amount to be estimated in a moving amount estimating apparatus; and
a travelling controller that controls the travelling unit so that the travelling unit travels from the current position to a predetermined target position; wherein
the second estimator compensates for the wheel moving amount using the compensation coefficient, and calculates a compensation wheel diameter based on a reference wheel diameter as a predetermined diameter of the wheel and the compensation coefficient so as to calculate the moving amount of the mobile body based on the compensation wheel diameter and the rotating amount of the wheel.

9. A moving amount estimating method for estimating a moving amount of a mobile body moving according to rotation of a wheel, the method comprising:
obtaining a plurality of position data to form a projection object image obtained by projecting an object present around the mobile body onto a predetermined coordinate before and after the mobile body moves during a predetermined period;
moving a plurality of second position data obtained one of before and after the movement parallelly and/or rotationally on the predetermined coordinate so as to calculate a plurality of moving position data;
calculating, when the plurality of moving position data is obtained such that a first projection object image to be formed by a plurality of first position data obtained the other of before and after the movement matches with a moving projection object image to be formed by the plurality of moving position data, a first reference moving amount based on a moving amount of the parallel movement and/or a moving amount of the rotational movement of the plurality of second position data;

calculating a second reference moving amount based on the rotating amount of the wheel during the predetermined period;

compensating a wheel moving amount to be calculated based on the rotating amount of the wheel based on a comparison between the second reference moving amount and the first reference moving amount;

estimating the compensated wheel moving amount as the moving amount of the mobile body;

calculating a compensation coefficient as a result of comparing the second reference moving amount with the first reference moving amount based on the first reference moving amount and the second reference moving amount;

compensating for the wheel moving amount using the compensation coefficient;

calculating a compensation wheel diameter based on a reference wheel diameter as a predetermined diameter of the wheel and the compensation coefficient; and calculating the moving amount of the mobile body based on the compensation wheel diameter and the rotating amount of the wheel.

* * * * *